United States Patent
Iwakiri

(10) Patent No.: US 7,514,703 B2
(45) Date of Patent: Apr. 7, 2009

(54) IMAGE INFORMATION DETECTING CASSETTE

(75) Inventor: Naoto Iwakiri, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 882 days.

(21) Appl. No.: 10/862,476

(22) Filed: Jun. 8, 2004

(65) Prior Publication Data

US 2004/0252613 A1 Dec. 16, 2004

(30) Foreign Application Priority Data

Jun. 10, 2003 (JP) ............................. 2003/164612
Jun. 10, 2003 (JP) ............................. 2003/164613

(51) Int. Cl.
*G11B 7/00* (2006.01)
(52) U.S. Cl. .................................................. 250/584
(58) Field of Classification Search ................ 250/584, 250/587, 583; 378/94, 98, 98.8, 102, 117, 378/169
See application file for complete search history.

(56) References Cited

U.S. PATENT DOCUMENTS

| | | | |
|---|---|---|---|
| 5,953,677 A | 9/1999 | Sato | |
| 6,268,614 B1 | 7/2001 | Imai | |
| 6,344,652 B1 | 2/2002 | Shoji | |
| 6,940,078 B2 * | 9/2005 | Yasuda et al. | ............. 250/484.4 |
| 2001/0020690 A1 | 9/2001 | Yasuda et al. | |
| 2003/0223540 A1 * | 12/2003 | Hayashida et al. | .......... 378/98.8 |
| 2004/0079908 A1 * | 4/2004 | Ohkubo | ...................... 250/582 |
| 2004/0136738 A1 * | 7/2004 | Yamamoto et al. | ............. 399/49 |
| 2006/0169907 A1 * | 8/2006 | Shinden | .................. 250/370.09 |

FOREIGN PATENT DOCUMENTS

| | | |
|---|---|---|
| EP | 0 603 709 A2 | 6/1994 |
| EP | 1343024 A1 | 9/2003 |
| JP | 63-80766 | 5/1988 |
| JP | 514776 A | 6/1993 |
| JP | 10107718 A | 4/1998 |
| JP | 11213112 A | 8/1999 |
| JP | 2003018262 A | 1/2003 |
| JP | 2003144385 A | 5/2003 |
| JP | 2000347330 A | 12/2008 |
| WO | 02/42797 A1 | 5/2000 |

* cited by examiner

*Primary Examiner*—David P. Porta
*Assistant Examiner*—Djura Malevic
(74) *Attorney, Agent, or Firm*—Sughrue Mion, PLLC

(57) ABSTRACT

An image information detecting cassette accommodating an image information detecting section capable of reducing its power consumption when not used. When the handle of the cassette is gripped by the operator for carrying, the handle grip signal is outputted from the handle grip detecting section. If the readout signal from the scan/readout section, X-ray ready signal from the external system controller, and release signal from the release switch are not outputted, that is, when the cassette is carried and not used, it is determined to be the out-of-use state by the out-of-use determining means. The low power consumption mode is set by the control section, and the power supply to the image information detecting section, reading light emitting section, detecting section driving section, nonvolatile memory, X-ray buzzer, and matrix indicator is discontinued by the power supply suppressing section.

31 Claims, 15 Drawing Sheets

IMAGE INFORMATION DETECTING CASSETTE

BACKGROUND OF THE INVENTION

1. Field of the Invention

The present invention relates to an image information detecting cassette having an image information detecting section and a case for accommodating the image information detecting section, and an image information detecting cassette having an image information detecting section for recording image information by storing charges generated therein when irradiated by the recording light carrying the image information and a case for accommodating the image information detecting section.

2. Description of the Related Art

Today, in the field of X-ray and other photography of medical diagnosis and other purposes, various types of image information detecting apparatuses are proposed and put into practice as described, for example, in U.S. Pat. No. 6,268,614. These apparatuses have an image information detecting section for recording image information by storing charges generated therein when irradiated by the recording light (X-ray and the like) carrying the image information.

As for the image information detecting section used for the image information detecting apparatus, various types have been proposed, and from the aspect of charge reading out process in which the charges stored in the detecting section are read out to the outside, the optical scan reading system in which the charges are read out by scanning the detecting section with reading light and electrical scan reading system in which the charges are read out by electrically scan driving TFTs (thin film transistors) and the like embedded in the detecting section are widely known.

Further, the image information detecting cassette accommodating the image information detecting apparatus described above is also proposed as described, for example, in U.S. Pat. No. 6,344,652. The image information detecting cassette has advantages that it is easy to handle and portable.

However, in the image information detecting cassette described above, it is often the case that the amount of power substantially corresponding to that required for normal operation of the cassette is constantly supplied even when it is not used, for example, when it is carried or the like, posing a problem of larger power consumption. When a battery is used for the power supply, for example, this causes the shortened battery life or larger battery size.

In addition, in the image information detecting cassette described above, sufficient considerations are not given to the safety of the operator, including those under abnormal circumstances. For example, if the image information detecting cassette is dropped on the floor while it is being carried, the inner circuits may be damaged by the crashing and the operator may get electric shocks. Also, certain inner troubles of the cassette may cause the operator to be exposed to dangers including electric shocks. It is particularly dangerous where the circuit for applying a high voltage is included.

SUMMARY OF THE INVENTION

In recognition of the circumstance described above, it is an object of the present invention to provide an image information detecting cassette capable of reducing the power consumption. It is yet another object of the present invention to provide an image information detecting cassette capable of enhancing safety of the operator under abnormal circumstances.

The image information detecting cassette of the present invention comprises: an image information detecting section for recording image information by storing charges generated by the irradiation of the recording light carrying the image information; a detecting section driving means for applying recording electric fields to the image information detecting section; a reading out means for reading out image signals in accordance with the image information recorded in the image information detecting section; a power supplying means for supplying power to the detecting section driving means and reading out means; a case for accommodating the image information detecting section, detecting section driving means, reading out means, and power supplying means; an out-of-use state determining means for determining the out-of-use state of the image information detecting cassette; and a power supply suppressing means for suppressing the power supply to the detecting section driving means or reading out means when the cassette is determined to be an out-of-use state by the out-of-use state determining means.

The term "power supplying means" as used herein means, for example, a battery and power supply wiring when the cassette has a built-in battery, and a power source terminal and power supply wiring when the cassette is powered from an external power source.

The term "power supply suppressing means for suppressing the power supply to the detecting section driving means or reading out means" as used herein is a means for decreasing or discontinuing the power supply to at least some of the circuits forming the detecting section driving means or reading out means. The "some of the circuits" described above may be selected from those that consume comparatively greater amount of power, have a short rising time when the power is restored to normal and the like.

When the image information detecting cassette has a handle attached to the case and grippable when carried, and a handle grip detecting means for detecting the gripping of the handle, the out-of-use state determining means may be an out-of-use state determining means configured to determine the out-of-use state of the cassette based on the detection of the gripping of the handle by the handle grip detecting means.

Further, when the image information detecting cassette has a connecting terminal capable of connecting an external device, and an unconnected state detecting means for detecting the unconnected state of the connecting terminal with the external device, the out-of-use state determining means may be an out-of-use state determining means configured to determine the out-of-use state of the cassette based on the detection of the unconnected state by the unconnected state detecting means.

As for the "connecting terminal", there are several different kinds, and when the image information detecting cassette is used in an X-ray imaging system, for example, the connecting terminal may include the terminal for inputting a timing signal for X-ray irradiation from the X-ray irradiating device, for inputting operational data from the system controller or the like that controls the overall X-ray imaging system, for inputting various kinds of imaging data, such as imaging conditions, image information reading out conditions and the like, and for supplying the power from an external power source.

Further, when the image information detecting cassette has a wireless communication means capable of communicating with an external device, and out-of-communication state detecting means for detecting the out-of-communication state of the wireless communication means, the out-of-use state determining means may be an out-of-use state determining means configured to determine the out-of-use state of the cassette based on the detection of the out-of-communication state by the out-of-communication state detecting means.

The term "out-of-communication state of the wireless communication means" as used herein means that the wireless communication means is unable to communicate with a wireless communication means attached to an external device, because, for example, they are separated too far apart with each other, the switch of the wireless communication means attached to the external device is switched off or the like.

Further, when the image information detecting cassette has a time overrun detecting means for measuring the elapsed time from the immediately preceding irradiation time of the recording light described above and detecting the overrun of the elapsed time over a predetermined time, the out-of-use state determining means may be an out-of-use state determining means configured to determine the out-of-use state of the cassette based on the detection of the time overrun by the time overrun detecting means.

The image information detecting cassette may have a power supply suppressed state indicating means for indicating that the power supply to the detecting section driving means or reading out means described above is suppressed by the power supply suppressing means.

Another image information detecting cassette of the present invention comprises: an image information detecting section for recording image information by storing charges generated by the irradiation of the recording light carrying the image information; a detecting section driving means for applying a recording voltage to the image information detecting section; a reading out means for reading out image signals in accordance with the image information recorded in the image information detecting section; a power supply wiring means connected to a power source and configured to supply power to the detecting section driving means and reading out means; a case for accommodating the image information detecting section, detecting section driving means, reading out means, and power supply wiring means; an abnormal state detecting means for detecting an abnormal state of the image information detecting section, detecting section driving means, or reading out means; and a power supply inhibiting means for inhibiting the power supply from the power supply wiring means to the detecting section driving means when the abnormal state is detected by the abnormal state detecting means.

Still another image information detecting cassette of the present invention comprises: an image information detecting section for recording image information by storing charges generated by the irradiation of the recording light carrying the image information; a detecting section driving means for applying a recording voltage to the image information detecting section; a reading out means for reading out image signals in accordance with the image information recorded in the image information detecting section; a power supply wiring means connected to a power source and configured to supply power to the detecting section driving means and reading out means; a case for accommodating the image information detecting section, detecting section driving means, reading out means, and power supply wiring means; an acceleration sensor; an abnormal acceleration state determining means for determining an abnormal acceleration state in which the acceleration detected by the acceleration sensor is greater than or equal to a predetermined dangerous level; and a power supply inhibiting means for inhibiting the power supply from the power supply wiring means to the detecting section driving means when the abnormal acceleration state is determined by the abnormal acceleration state determining means.

In each of the image information detecting cassettes described above, the term "recording light" means an electromagnetic wave carrying image information to be recorded. Specific examples of the electromagnetic wave include recording radiation carrying image information of a subject, and light generated in a scintillator (fluorescent material) by irradiating the recording radiation thereon.

The term "reading out means for reading out image signals" as used herein means a reading out means for reading out image information by optically or electrically scanning the image information detecting section. When the image information is read out by optically scanning the reading light, for example, the reading out means is a means configured to scan the reading light and read out the image information, and if the image information is read out by electrically scan driving TFTs or the like, it is a means configured to scan driving the TFTs and read out the image information.

The term "power supply wiring means" as used herein means, for example, power supply wiring connecting each section of the image information detecting cassette with a power source such as a battery or the like, or a power source terminal and power supply wiring if the power is supplied from an external power source. The term "power source" as used herein means a built-in battery, external power source or the like connected to the image information detecting cassette through a power cable or the like.

The term "predetermined dangerous acceleration level" as used herein means an acceleration level of, for example, ½·G (Gravitational Constant) or the like which is not likely to be exceeded by the acceleration level of the image information detecting cassette in normal usage.

The image information detecting cassettes described above may have an out-of-use state determining means configured to determine an out-of-use state of the cassette based on the acceleration level detected by the acceleration sensor, which falls in the range greater than a predetermined out-of-use state acceleration level, which is greater than zero and smaller than the predetermined dangerous level, and smaller than the predetermined dangerous level; and a power supply suppressing means for suppressing the power supply to the detecting section driving means or reading out means when the cassette is determined to be the out-of-use state by the out-of-use state determining means.

The term "predetermined out-of-use state acceleration level" as used herein means an acceleration level of, for example, ½₀·G or the like which is likely to be exceeded by the acceleration level of the cassette when it is out-of-use state including when it is carried or the like.

The term "power supply suppressing means for suppressing the power supply to the detecting section driving means or reading out means" as used herein is a means for decreasing or discontinuing the power supply to at least some of the circuits forming the detecting section driving means or reading out means. The "some of the circuits" described above may be selected from those that consume comparatively greater amount of power, have a short rising time when the power is restored to normal and the like.

The power supply inhibiting means described above may be a power supply inhibiting means for electrically disconnecting the power source from the power supply wiring means when inhibiting the power supply.

Further, each of the image information detecting cassettes described above may be an image information detecting cassette having an inhibited state notifying means for notifying the inhibited state of the power supply.

The "inhibited state notifying means" is any means as long as it is capable of notifying the operator of the inhibited state of the power supply. More specifically, it may include color or light indications, alarms or the like.

The image information detecting cassette of the present invention has an out-of-use state determining means for determining an out-of-use state of the cassette; and a power supply suppressing means for suppressing the power supply to the detecting section driving means or reading out means when the cassette is determined to be the out-of-use state by the out-of-state determining means, so that the power supply thereto is automatically suppressed when the cassette is determined to be the out-of-use state, thereby the power consumption of the cassette may be reduced.

When the out-of-use state determining means described above is an out-of-use state determining means configured to determined the out-of-use state of the cassette based on the detection of the gripping of the handle by the handle grip detecting means for detecting that the handle attached to the case is gripped, the power supply is suppressed based on the gripping of the handle by the user for carrying or the like, so that the power consumption of the cassette may be reduced when it is not used such as the time when it is carried.

Further, when the out-of-use state determining means described above is an out-of-use state determining means configured to determine an out-of-use state of the cassette based on the detection of the unconnected state of the connecting terminal by the unconnected state detecting means, the power consumption of the cassette may be reduced when it is not used such as the time when the external device is disconnected from the connection terminal by the user.

Further, when the out-of-use state determining means described above is an out-of-use state determining means configured to determine an out-of-use state of the cassette based on the detection of the out-of-communication state by the out-of-communication state detecting means for detecting the out-of-communication state of the wireless communication means, the power consumption of the cassette may be reduced when it is not used such as the time when the wireless communication means provided on the image information detecting cassette is in the out-of-communication state, that is, when the cassette is carried to a place far apart from the wireless communication means connected to the external device, or when the wireless communication means connected to the external device is switched off.

Further, when the out-of-use state determining means described above is an out-of-use state determining means configured to determine an out-of-use state of the cassette based on the detection of the time overrun by the time overrun detecting means for measuring the elapsed time from the immediately preceding irradiation time of the recording light and detecting the time overrun of the elapsed time over a predetermined time, the power consumption of the cassette may be reduced when it is not used such as the case where no X-ray is irradiated after the predetermined time is elapsed from the immediately preceding X-ray irradiation time, that is, the case where X-ray irradiation is not implemented in succession and the like.

Further, when the image information detecting cassette has a power supply suppressed state indicating means for indicating that the power supply to the detecting section driving means or reading out means is suppressed by the power supply suppressing means, the user of the cassette may readily recognize that the power supply is suppressed.

According to another image information detecting cassette of the present invention, the power supply from the power supply wiring means to the detecting section driving means is inhibited when an abnormal state is detected in the image information detecting section, detecting section driving means, or reading out means by the abnormal state detecting means, that is, the detecting section driving means is deactivated when any one of the image information detecting section, detecting section driving means, or reading out means has a trouble, so that unwanted voltages are not applied to the image information detecting section, thereby the safely of the operator may be enhanced.

According to still another image information detecting cassette of the present invention, the power supply from the power supply wiring means to the detecting section driving means is inhibited when the acceleration detected by the acceleration sensor is greater than or equal to a predetermined dangerous acceleration level, that is, the detecting section driving means is deactivated when the cassette is falling or the like, so that unwanted voltages are not applied to the image information detecting section even when the image information detecting cassette is damaged by the crashing, thereby the safely of the operator may be enhanced.

When the acceleration level detected by the acceleration sensor described above is greater than a predetermined out-of-use state acceleration level and smaller than the predetermined dangerous acceleration level, and the image information detecting cassette is determined to be the out-of-use state based on this acceleration level, the power supply from the power supply wiring means to the detecting section driving means or reading out means is suppressed, so that the power consumption of the cassette may be reduced when it is not used such as the time when it is carried.

When the power supply inhibiting means is a power supply inhibiting means configure to electrically disconnect the power source from the power supply wiring means when inhibiting the power supply, the safety of the operator may further be ensured.

Further, when the image information detecting cassette has an inhibited state notifying means for notifying that the power supply is inhibited when the power supply is inhibited by the power supply inhibiting means described above, the operator may readily recognize that the power supply is inhibited.

DESCRIPTION OF THE PREFERRED EMBODIMENTS

Figure 1:
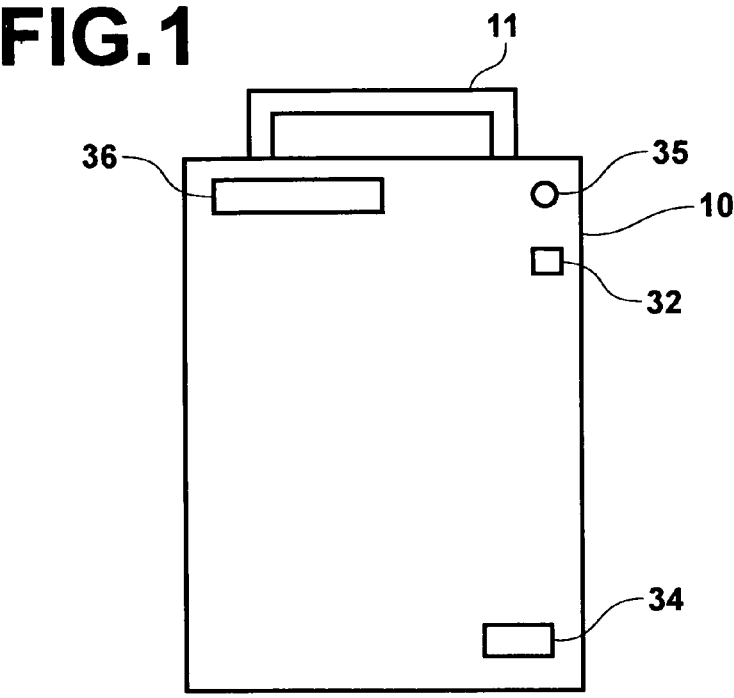
FIG. 1 is an overview of an image information detecting cassette according to a first embodiment of the present invention.
Figure 2:
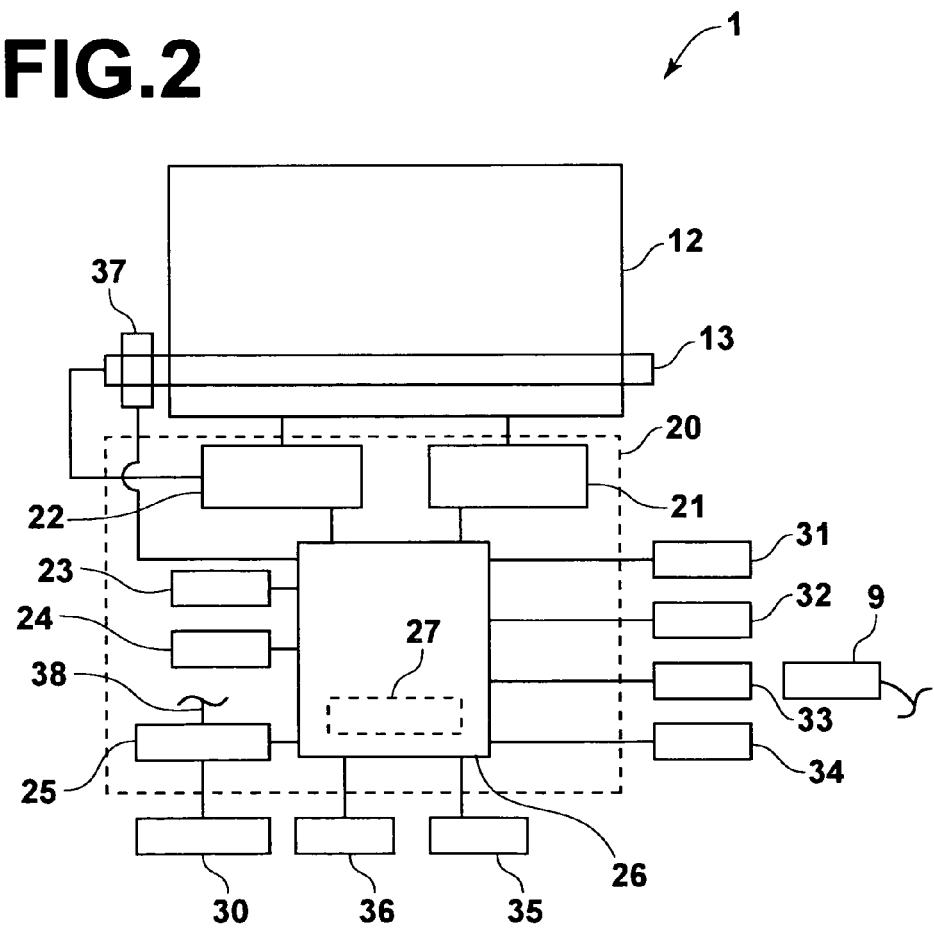
FIG. 2 is a configuration and circuit diagram of the relevant part of the image information detecting cassette shown in FIG. 1.

Hereinafter, the preferred embodiments of the present invention will be described in detail with reference to the accompanying drawings. FIG. 1 is an overview of an image information detecting cassette 1 according to a first embodiment of the present invention, and FIG. 2 is a configuration and circuit diagram of the relevant part of the image information detecting cassette 1. The image information detecting cassette 1 is intended for use in medical X-ray imaging, and comprises a case 10 substantially rectangular solid and containing an image information detecting section 12, reading light emitting section 13, control circuit section 20 and battery 30 therein; and a handle 11 attached to the case 10.

The image information detecting section 12 is configured to record image information carried by X-ray by storing charges generated therein as the charges of the latent image when exposed to the X-ray which is the recording light transmitted through the subject. The image information detecting section 12 has a set of layers layered in the order of a first electrode layer configured to transmit X-ray; a recording photoconductive layer configured to take on conductivity when exposed to the X-ray; a charge transport layer configured to act as an insulator against the charges of the latent image and as a conductor for the transport charges having opposite polarity to that of the charges of the latent image; a reading photoconductive layer configured to take on conductivity when exposed to reading light; and a second electrode layer configured to transmit the reading light.

When recording image information, a high voltage is applied between the first and second electrode layers, and X-ray is irradiated from the side of the first electrode layer with the electric fields being applied, and an amount of charges proportional to the dose of X-ray irradiated thereon is stored in a storage section formed substantially at the interface between the recording photoconductive layer and charge transport layer. When reading out the image information, the image information detecting section 12 is scanned with the reading light emitted from the reading light emitting section 13, and the image information recorded in the image information detecting section 12 is read out.

The control circuit section 20 has a detecting section driving section 21 configured to apply electric fields to the image information detecting section 12 when image information is recorded; a scan/readout section 22 configured to perform optical scanning over the image information detecting section 12 with the reading light emitting section 13, and read out image signals in accordance with the image information recorded in the image information detecting section 12; a volatile memory 23 which is primarily used as a buffer memory; a detachable nonvolatile memory 24; a power supply suppressing section 25 connected to the battery 30, and configured to suppress the power supply to each section when the low power consumption mode is selected, which will be described hereinafter; and a control section 26 connected to the detecting section driving section 21, scan/readout section 22, volatile memory 23, nonvolatile memory 24, and power supply suppressing section 25, and configured to control the operation of each section. The scan/readout section 22 together with the reading light emitting section 13 serves as the reading out means of the present invention.

The control section 26 has an out-of-use state determining section 27, and connected to a handle grip detecting section 31 configured to output a grip signal to the out-of-use state determining section 27 of the control section 26 when the handle 11 is gripped; a release switch 32 configured to output a release signal to the out-of-use state determining section 27 when depressed by the user; a connecting terminal 33 connectable to a cable connecting terminal 9 having a cable connected to a system controller (not shown); an X-ray buzzer 34 configured to give an alarm when X-ray is irradiated; a low power consumption mode indicator lamp 35 acting as the power supply suppressed state indicating means configured to indicate that the image information detecting cassette 1 is in the low power consumption mode which will be described hereinafter; a matrix indicator 36 configured to indicate requisite information such as the indication that notifies that the X-ray is ready to be irradiated and the like; and a light emitting section locking mechanism 37 configured to lock the reading light irradiating section 13 as required. The release switch 32 has also a lamp which will be turned on when the switch is depressed.

Prior to the X-ray imaging, various kinds of data, including an imaging menu, ID information, application voltage for the image recording, reading out speed and the like are inputted from the system controller to the control section 26 through the connecting terminals 9 and 33. Also, an X-ray ready signal is inputted to the control section 26 from the system controller during the time period from the time when the preparation for the X-ray irradiation is completed until the time after the X-ray is irradiated, and an X-ray irradiation signal when the X-ray is irradiated. When the image information is readout, a readout signal is outputted from the scan/readout section 22 to the out-of-use state determining section 27.

In addition to the grip signal inputted from the handle grip detecting section 31, the out-of-use state determining section 27 of the control section 26 determines whether the image information detecting cassette 1 is out-of-use or in-use state based on the release signal inputted from the release switch 32, X-ray ready signal inputted from the connecting terminal 33, and readout signal inputted from the scan/readout section 22.

When the image information detecting cassette 1 is determined to be out-of-use state by the out-of-use state determining section 27, the low power consumption mode will be set by the control section 26 as the power mode in which only some of the sections are powered and the power supply to other sections is discontinued, and the low power consumption mode signal will be outputted to the power supply suppressing section 25. On the other hand, when the image information detecting cassette 1 is determined to be in-use state by the out-of-use state determining section 27, the normal power mode will be set by the control section 26 as the power mode in which all the necessary sections are powered, and the normal power mode signal will be outputted to the power supply suppressing section 25. The control section 26 also assumes control of overall operation of the cassette 1.

Power supply wiring 38 extends from the power supply suppressing section 25 to the image information detecting section 12, reading light emitting section 13, detecting section driving section 21, scan/readout section 22, volatile memory 23, nonvolatile memory 24, control section 26, handle grip detecting section 31, release switch 32, X-ray buzzer 34, low power consumption mode indicator lamp 35, and matrix indicator 36. In the normal power mode, the power is supplied from the battery 30 to each section through the power supply wiring 38. In FIG. 2, the interconnections of the power supply wiring 38 are not indicated for clarity. The battery 30 together with the power supply wiring 38 serves as the power supplying means of the present invention.

Figure 3:
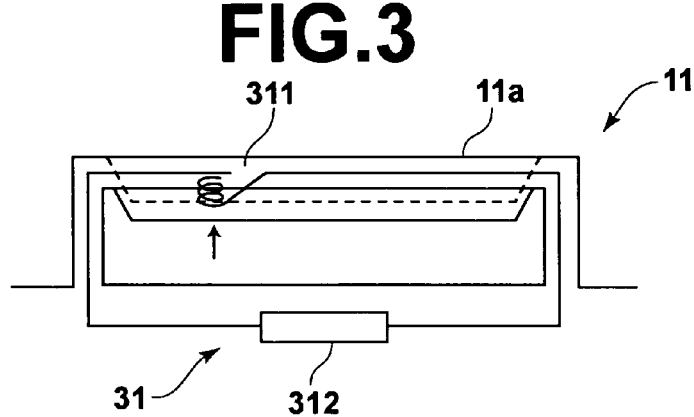
FIG. 3 is a schematic diagram of a handle grip detecting section.

The hand grip detecting section 31 comprises a switch 311 provided in the grip section 11a of the handle 11, and configured to be normally open and automatically close when the handle is gripped, and a detecting section 312 configured to output a grip signal when the switch 311 is closed as shown in FIG. 3.

Hereinafter, the operation of the image information detecting cassette 1 of this embodiment will be described. First, the image information recording and reading out operation will be described. Prior to the X-ray imaging, various kinds of data, including an imaging menu, ID information, application voltage for the image recording, reading out speed and the like are inputted from the system controller (not shown) to the control section 26. The control section 26 will store these data in the nonvolatile memory 24, and reads out for use as required. Such data may be prerecorded in the detachable nonvolatile memory 24 which will then be attached to the image information detecting cassette 1 to read out the data as required. Also, the volatile memory 24 may store thumbnail images of imaging history, error logs and the like, which may be used for conducting failure analysis when the cassette 1 has some trouble or the like. An X-ray ready signal is inputted to the control section 26 from the system controller (not shown) through the connecting terminal 33 during the time period from the time when the preparation for the X-ray irradiation is completed until the time after the X-ray is irradiated. Further, an X-ray irradiation signal is inputted to the control section 26 when the X-ray is irradiated.

When the X-ray ready signal is inputted to the control section 26, a recording high voltage will be applied to the image information detecting section 12 by the control section 26 through control of the detecting section driving section 21. At the same time, the control section 26 will cause the X-ray ready state to be displayed on the matrix indicator 36.

Then, the X-ray transmitted through the subject is irradiated on the image information detecting section 12, and an amount of charges in accordance with the dose of the X-ray is stored therein as the charges of the latent image. Also, the control section 26 will cause an audible alarm for notifying the X-ray irradiation to be given by the X-ray buzzer 34 when the X-ray is irradiated.

When reading out the image information, the control section 26 controls the scan/readout section 22 to scan the image information detecting section 12 with the reading light emitted from the reading light emitting section 13 and read out the image information recorded in the image information detecting section 12, which will be stored first in the volatile memory 23, then sequentially to the nonvolatile memory 24. In cases where rapid access is required, for example, when reading out the image information, implementing image processing to the image information, or transferring the image information, the volatile memory 23 may be used as the buffer memory. If an external power source is used as the power source of the cassette 1, it is preferable that a built-in battery is separately provided to supply power to the volatile memory 23 as required, such as the case when the external power source is disconnected or the like. Further, where a low noise readout operation is required, such as the case when reading out the image information recorded by a low-dose imaging, the built-in battery is preferable in order to avoid the noise induced by the external power source.

It may be possible, for example, to provide a power supplying mode in which the power source is switched from the external power source to the built-in battery in cases where the image information seems to have been recorded by a low-dose imaging based on the information on the imaging dose or the information from which the imaging dose may be estimated (e.g., information on the region of the subject imaged, imaging method, imaging conditions, and the like). In this case, the power supplying mode described above may be a power supplying mode in which the imaging dose is determined based on the information described above, and the power supplying mode will be switched from the external power source to the built-in battery when the imaging dose is determined to be a low level, or it may be a power supplying mode in which the relationship between the information described above and the power supplying mode is predetermined, and the power supplying mode will be switched based on the information obtained and the predetermined relationship. The imaging dose to be regarded as low level may be arbitrarily defined based on the noise to be generated and permissible noise level.

Figure 4:
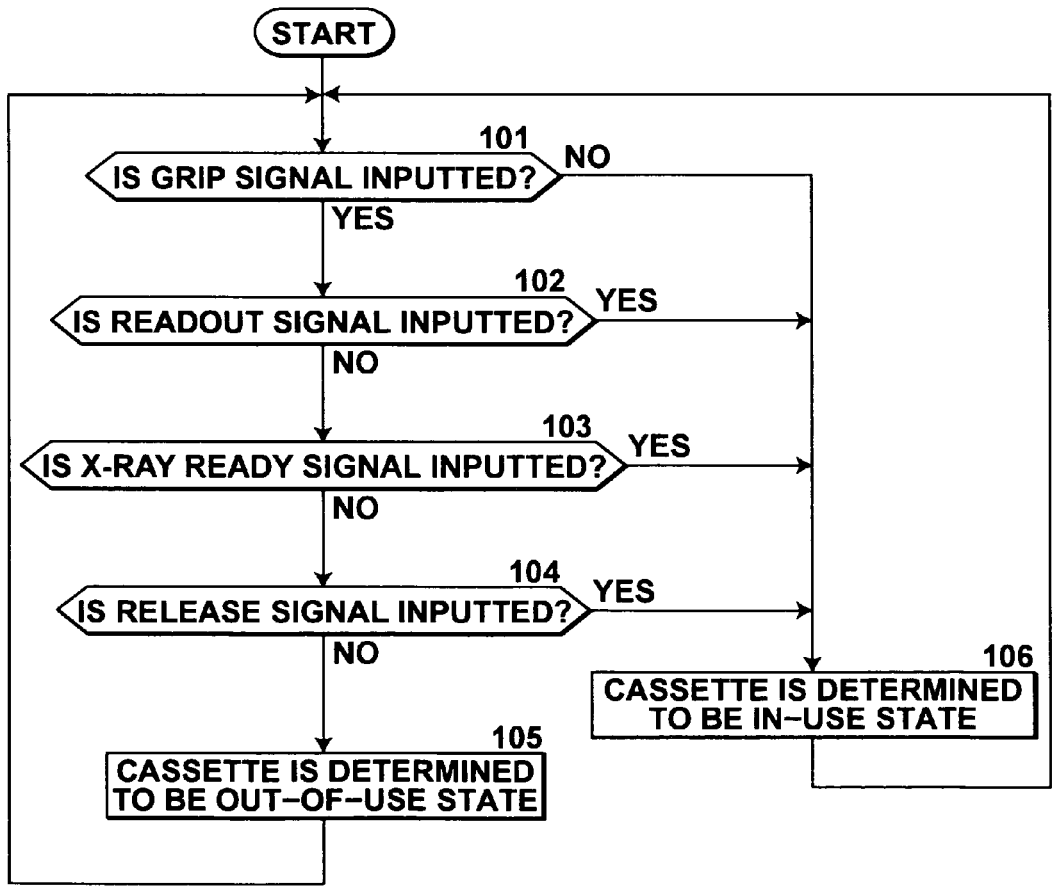
FIG. 4 is a flow diagram illustrating the operational flow of the image information detecting cassette shown in FIG. 1.

Next, power mode setting process will be described. First, determination of in-use state by the out-of-use state determining section 27 will be described with reference to the flow diagram shown in FIG. 4.

In step 101, determination is made as to whether the grip signal is inputted from the handle grip detecting section 31. If not, the process will move forward to step 106 and the cassette 1 will be determined to be in-use state, and if inputted, it will move forward to step 102. In step 102, determination is be made as to whether the readout signal is inputted from the scan/readout section 22. If inputted, the process will move forward to step 106, and if not, it will move forward to step 103.

In step 103, determination is made as to whether the X-ray ready signal is inputted from the external system controller. If inputted, the process will move forward to step 106, and if not, it will move forward to step 104.

In step 104, determination is made as to whether the release signal is inputted from the release switch 32. If inputted, the process will move forward to step 106, and if not, it will move forward to step 105.

In step 105, the cassette 1 is determined to be the out-of-use state by the out-of-use state detecting section 27 and the result will be outputted to the control section 26. Thereafter, the process will return to step 101.

In step 106, the cassette 1 is determined to be the out-of-use state by the detecting section 27 and the result will be outputted to the control section 26. Thereafter, the process will return to step 101.

When the cassette 1 is determined to be in-use state by the out-of-use state determining section 27 through the determination process described above, the control section 26 will supply the normal power mode signal to the power supply suppressing section 25 and deactivate the light emitting section locking mechanism 37 if it is activated to release the lock of the reading light emitting section 13. The power supply suppressing section 25 will supply the power to each section when the normal power mode signal is received.

If the cassette 1 is determined to be the out-of-use state by the out-of-use state determining section 27, the control section 26 will supply the low power consumption mode signal to the power supply suppressing section 25. When the low power consumption mode signal is inputted, the power supply suppressing section 25 stops supplying the power to the image information detecting section 12, reading light emitting section 13, detecting section driving section 21, nonvolatile memory 24, X-ray buzzer 34, and matrix indicator 36, while it will continue supplying the power to scan/readout section 22, volatile memory 23, control section 26, handle grip detecting section 31, release switch 32, and low power consumption mode indicator lamp 35. The control section 26 will cause the low power consumption mode indicator lamp 35 to be turned on, and the light emitting section locking mechanism 37 to be activated so that the reading light emitting section 13 is locked.

The power supply to the scan/readout section 22 and control section 26 is not necessarily the same as in the normal power mode. The power may be supplied only to the circuits necessary for maintaining the low power consumption mode, or in addition to these circuits, it may be supplied only to those desirable to be kept operational, such as those requiring a longer rising time so that the cassette may immediately return to the normal power mode when the low power consumption mode is changed. For other circuits, the power supply may be discontinued or the supply voltage may be decreased.

If the handle grip signal is not outputted from the handle grip detecting section 31, the process will move forward from step 101 to step 106 and the cassette 1 will be determined to be in-use state, and the normal power mode will be set as the power mode through the control operation described above.

Even when the handle grip signal is outputted from the handle grip detecting section 31, if the image information reading is in progress and the readout signal is outputted from the scan/readout section 22, the process will move forward from step 102 to step 106, so that the cassette 1 will be determined to be the in-use state, and the normal power mode will be set.

Likewise, even when the handle grip signal is outputted from the handle grip detecting section 31, if the cassette 1 is in the preparatory process for X-ray imaging and the X-ray ready signal is outputted from the external system controller, the process will move forward from step 103 to step 106, so that the cassette 1 will be determined to be the in-use state and the normal power mode will be set. The handle grip signal and X-ray ready signal may be outputted simultaneously as described above when X-ray imaging is conducted with the handle 11 being gripped in order to keep the image information detecting cassette 1 at an appropriate position or the like. When the X-ray ready signal is inputted, it will be indicated on the matrix indicator 36 as described above.

Further, if the release switch 32 is depressed by the operator, the release signal will be inputted to the out-of-use state detecting section 27, and the process moves forward from step 104 to step 106, so that the cassette 1 will be determined to be the in-use state and the normal power mode will be set. The release switch has a lamp which will be turned on when the switch is depressed, so that the operator may readily recognize that the release switch is being depressed.

Meanwhile, when the cassette 1 is carried in normal way, for example, in which the handle grip signal is outputted from the handle grip detecting section 31, and the readout signal from the scan/readout section 22, X-ray ready signal from the external system controller and release signal from the release switch 32 are not outputted, that is, when the image information detecting cassette 1 is not used, the process will move forward from step 101 through step 102, step 103, step 104 to step 105, so that the cassette 1 will be determined to be the out-of-use state and the low power consumption mode will be set as the power mode, thereby the power consumption of the cassette 1 may be reduced.

As would be clear from the description above, in the image information detecting cassette 1 according to this embodiment of the present invention, the image information detecting cassette 1 is determined to be the out-of-use state based on the detection of the gripping of the handle by the handle grip detecting section 31 configured to detect that the handle is gripped when the handle 11 attached to the case 10 is gripped, and the low power consumption mode will be set automatically, in which the power supply is suppressed, so that the power consumption may be reduced when the cassette 1 is carried or the like. Further, while the image information reading is in progress or the cassette 1 is in the preparatory process for the irradiation of recording light (X-ray), or when the release switch 32 is depressed by the user or the like, the image information detecting cassette 1 will be determined to be the in-use state and the normal power mode will be set, in which normal power is supplied. Thus, the low power consumption mode is prevented from being set while image information reading is in progress, or when X-ray imaging is conducted with the handle 11 being gripped, so that the usefulness of the image information detecting cassette 1 may be enhanced.

Figure 5A:
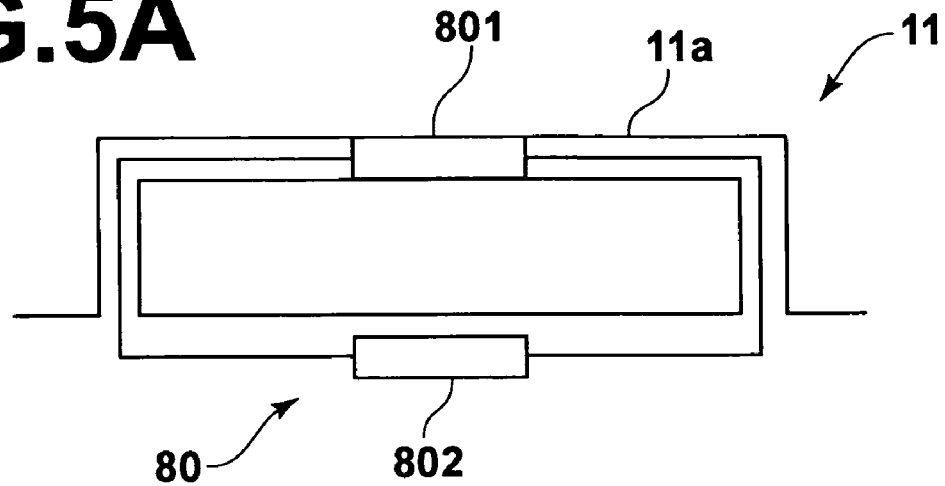
FIG. 5A is a schematic diagram of a handle grip detecting section.
Figure 5B:
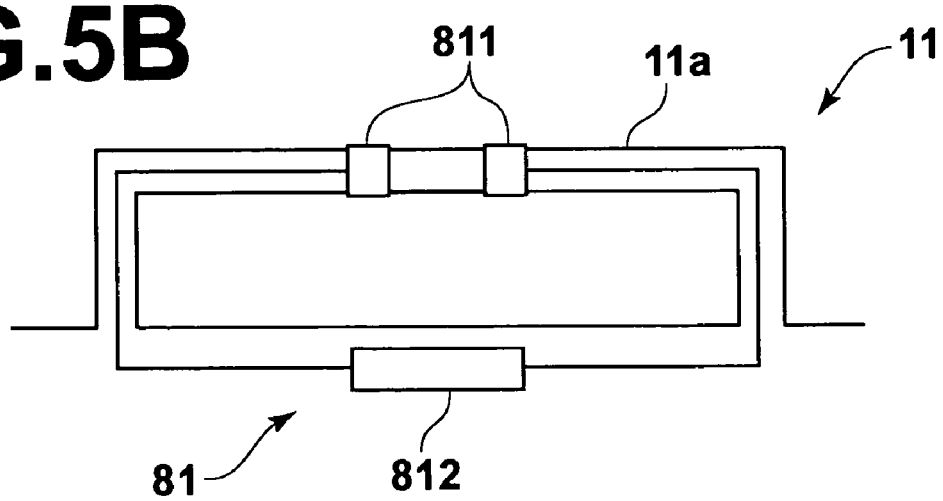
FIG. 5B is a schematic diagram of a handle grip detecting section.
Figure 6A:
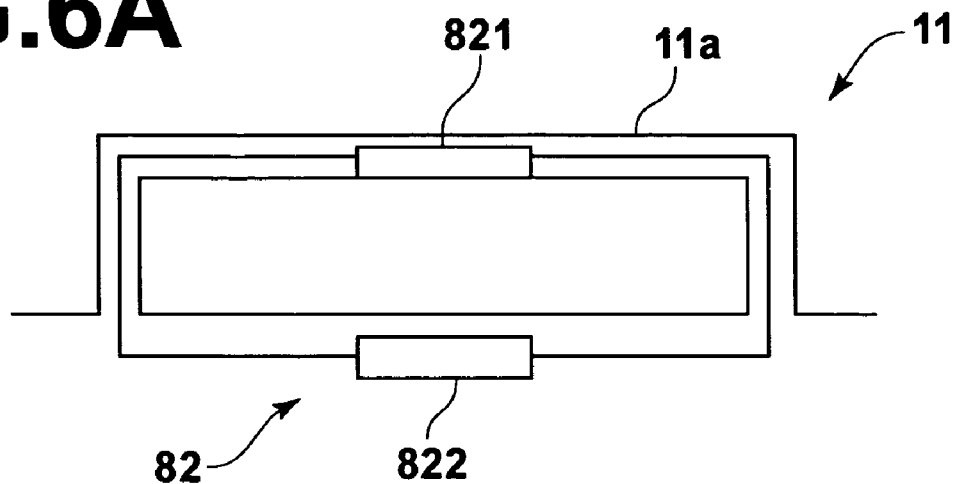
FIG. 6A is a schematic diagram of a handle grip detecting section.
Figure 6B:
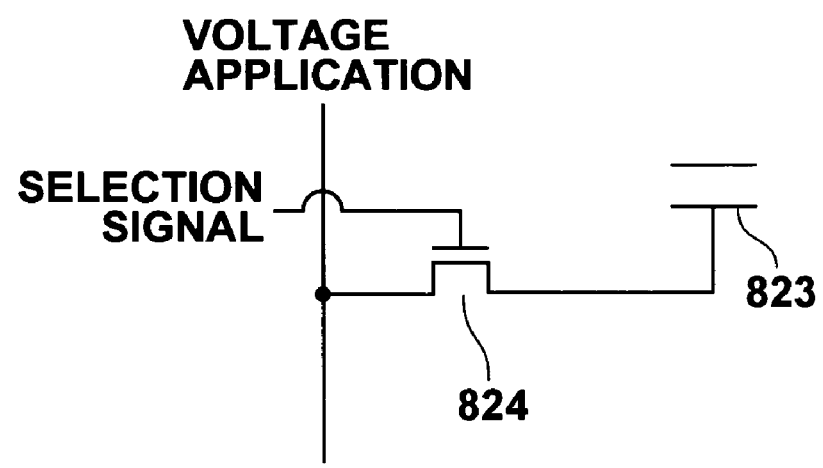
FIG. 6B is a schematic diagram of a handle grip detecting section.
Figure 7A:
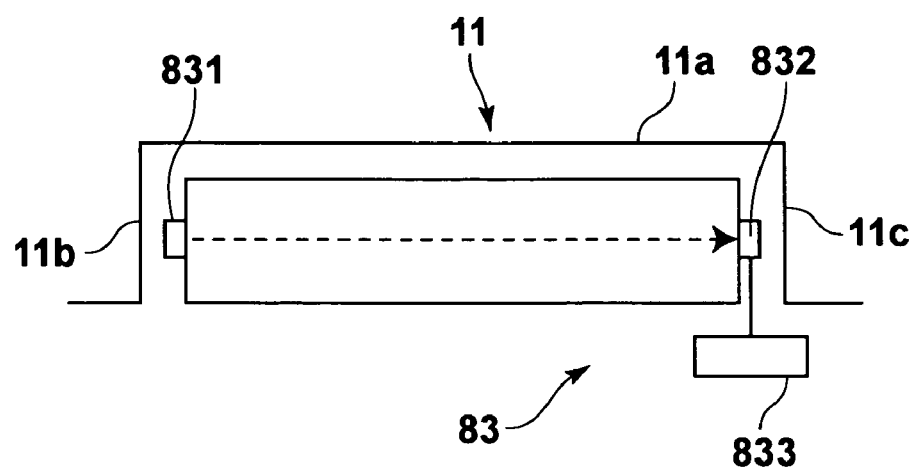
FIG. 7A is a schematic diagram of a handle grip detecting section.
Figure 7B:
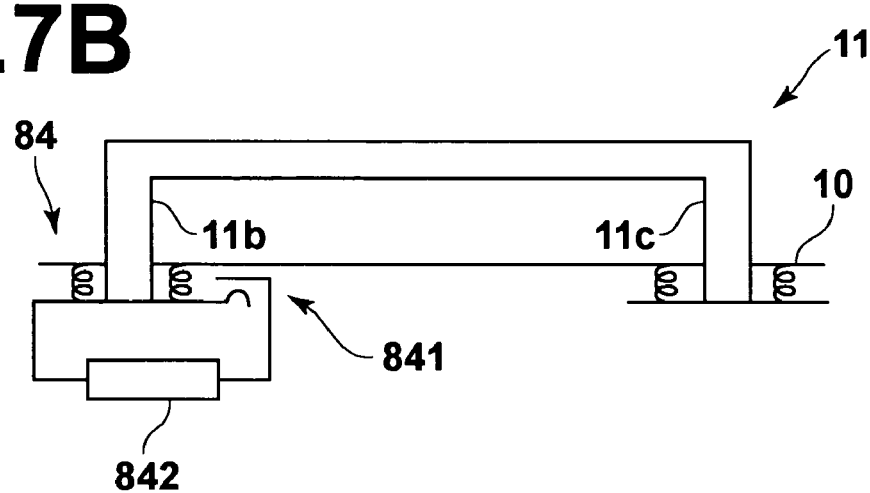
FIG. 7B is a schematic diagram of a handle grip detecting section.

In this embodiment, the handle grip detecting section 31 is used as the handle grip detecting means, but it is not limited to this, and variously configured handle grip detecting sections may be used. For example, the handle grip detecting section 80 comprised of a thermosensor 801 provided in the grip section 11a of the handle 11, and a detecting section 802 configured to output the grip signal based on the sensing result of the thermosensor 801 as shown in FIG. 5A, or a handle grip detecting section using an infrared sensing device instead of thermosensor may be used. When the handle 11 is gripped and the temperature of the thermosensor 801 is increased, the handle grip signal will be outputted from the handle grip detecting section 80. Also, the handle grip detecting section 81 comprised of a split electrode 811 provided in the grip section 11a of the handle 11 and a detecting section 812 configured to output the grip signal when the split electrode 812 becomes conductive as shown in FIG. 5B may be used. When the handle 11 is gripped and the two electrode terminals of the split electrode 811 are electrically connected, the handle grip signal will be outputted from the handle grip detecting section 81. Further, the handle grip detecting section 82 comprised of a capacitance sensor 821 provided in the grip section 11a of the handle 11, and a detecting section 822 configured to output the grip signal based on the sensing result of the capacitance sensor 821 as shown in FIG. 6A may be used. The capacitance sensor 821 described above comprises dielectric layers 823 provided in the grip section 11a and a transistor 824 for reading out the capacitance of the dielectric layers 823, and configured to detect the variation in the capacitance of the dielectric layers 823 as shown in FIG. 6B. When the handle 11 is gripped and the variation in the capacitance of the dielectric layers 823 is sensed, the handle grip signal will be outputted from the handle grip detecting section 82. Still Further, the handle grip detecting section 83 shown in FIG. 7A, the handle grip detecting section 84 shown in FIG. 7B and the like may also be used. The handle grip detecting section 83 is comprised of the infrared LED 831 provided on one of the shafts 11b of the handle 11, a photoconductor 832 provided on the other shaft 11c of the handle 11, and the detecting section 833, and configured to detect the blockage of the infrared light emitted from the infrared LED by the detecting section 833 and output the handle grip signal. The handle grip detecting section 84 has the switch 841 provided adjacent to the base of the shaft 11b and configured to close against the urging force when the cassette 1 is picked up by gripping the handle 11, the shafts 11b and 11c of the handle 11 being inserted into the case 10 by several millimeters and urged against the case, and the close of the switch 841 is detected by the detecting section 842. When the user picks up the cassettes 1 by gripping the handle 11, the switch 841 will be closed, and the handle grip signal will be outputted from the handle grip detecting section 84.

Figure 8:
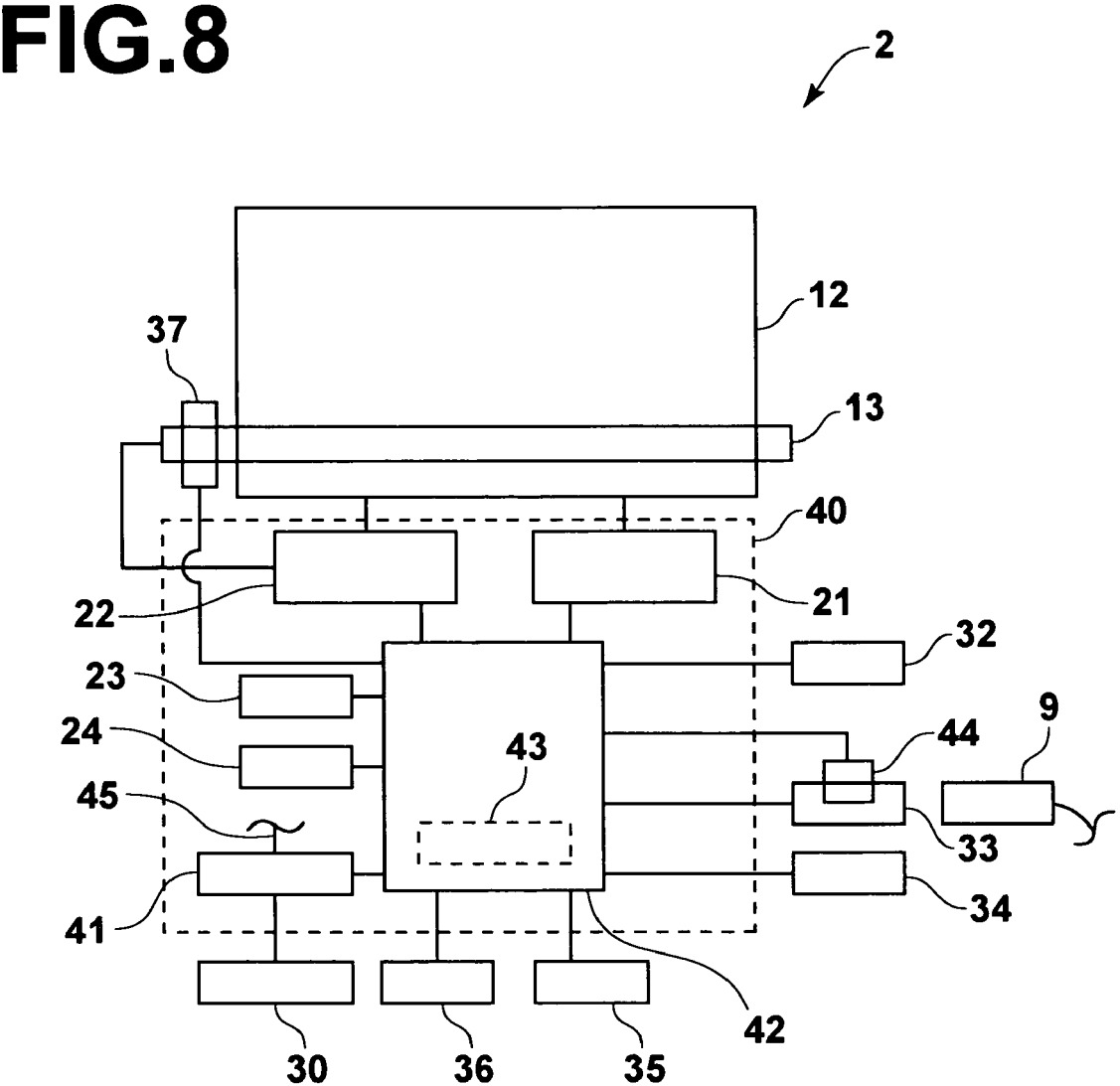
FIG. 8 is a configuration and circuit diagram of the relevant part of an image information detecting cassette according to a second embodiment of the present invention.

Hereinafter, an image information detecting cassette 2 according to a second embodiment of the present invention will be described with reference to FIG. 8. In FIG. 8, the element identical to that shown in FIG. 2 is given the same numeral and will not be elaborated upon further here unless otherwise specifically required. Also, the overview of the second embodiment will not be provided here since it is substantially identical to that of the first embodiment.

FIG. 8 is a configuration and circuit diagram of the relevant part of the image information detecting cassette 2. The control circuit section 40 has a detecting section driving section 21; a scan/readout section 22; a volatile memory 23; a detachable nonvolatile memory 24; a power supply suppressing section 41 for suppressing the power supply to each section when the low power consumption mode is selected; and a control section 42 connected to the detecting section driving section 21, scan/readout section 22, volatile memory 23, nonvolatile memory 24, and power supply suppressing section 41, and configured to control the operation of each section of the cassette 2.

The control section 42 has an out-of-use state determining section 43, and connected to a release switch 32, connecting terminal 33, X-ray buzzer 34, low power consumption mode indicator lamp 35, matrix indicator 36, light emitting section locking mechanism 37, and out-of-connection detecting section 44 configured to output an out-of-connection signal when a connection terminal 9 is not connected to the connecting terminal 33.

Prior to the X-ray imaging, various kinds of data, including an imaging menu, ID information, application voltage for the image recording, reading out speed and the like are inputted from the system controller to the control section 42 through the connecting terminals 9 and 33. Also, an X-ray ready signal is inputted from the system controller to the control section 42 and out-of-use state determining section 43 during the time period from the time when the preparation for the X-ray irradiation is completed until the time after the X-ray is irradiated. Also, an X-ray irradiation signal is inputted from the system controller to the control section 42 when the X-ray is irradiated. Further, when the image information is read out, a readout signal is outputted from the scan/readout section 22 to the out-of-use state determining section 43.

The out-of-use state determining section 43 of the control section 42 is provided for determining whether the image information detecting cassette 2 is out-of-use or in-use state based on the release signal inputted from the release switch 32 and readout signal inputted from the scan/readout section 22, in addition to the out-of-connection signal inputted from the out-of-connection detecting section 44.

When the image information detecting cassette 2 is determined to be in-use state by the out-of-use state determining section 43, the normal power mode will be set by the control section 42 as the power mode in which each section is powered, and if the image information detecting cassette 2 is determined to be the out-of-use state by the out-of-use state determining section 43, the low power consumption mode will be set by the control section 42 as the power mode in which only some of the sections are powered and the power supply to other sections is stopped. The control section 42 also assumes control of overall operation of the cassette 2.

Power supply wiring 45 extends from the power supply suppressing section 41 to the image information detecting section 12, reading light emitting section 13, detecting section driving section 21, scan/readout section 22, volatile memory 23, nonvolatile memory 24, control section 42, release switch 32, X-ray buzzer 34, low power consumption mode indicator lamp 35, matrix indicator 36, and out-of-connection detecting section 44. In the normal power mode, the power is supplied from the battery 30 to each section through the power supply wiring 45. In FIG. 8, the interconnections of the power supply wiring 45 are not indicated for clarity. The battery 30 together with the power supply wiring 45 serves as the power supplying means of the present invention.

Figure 9:
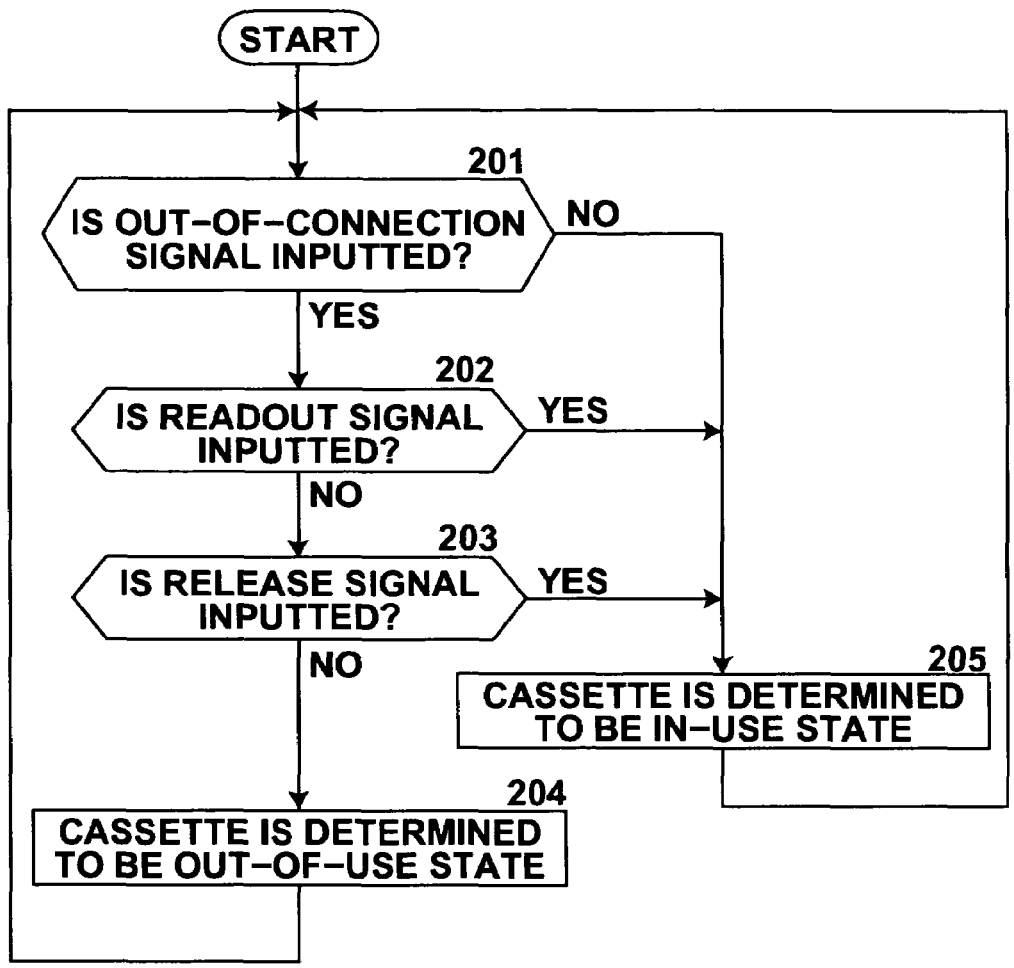
FIG. 9 is a flow diagram illustrating the operational flow of the image information detecting cassette shown in FIG. 8.

Hereinafter, the operation of the image information detecting cassette 2 of this embodiment will be described. Description of the image recording and reading out operation of the cassette 2 will not be provided here, since it is substantially identical to that of the cassette 1 of the first embodiment, and the power mode setting process will be described hereinafter. First, determination of in-use state by the out-of-use state determining section 43 will be described with reference to the flow diagram shown in FIG. 9.

In step 201, determination is made as to whether the out-of-connection signal is inputted from the out-of-connection detecting section 44. If not, the process will move forward to step 205 and the cassette 2 will be determined to be the in-use state, and if inputted, it will move forward to step 202. In step 202, determination is made as to whether the readout signal is inputted from the scan/readout section 22. If inputted, the process will move forward to step 205, and if not, it will move forward to step 203.

In step 203, determination is made as to whether the release signal is inputted from the release switch 32. If inputted, the process will move forward to step 205, and if not, it will move forward to step 204.

In step 204, the cassette 2 is determined to be the out-of-use state, and thereafter, the process will return to step 201.

In step 205, the cassette 2 is determined to be the in-use state, and thereafter, the process will return to step 201.

When the cassette 2 is determined to be the in-use state by the out-of-use determining section 43 through the determination process described above, the control section 42 will supply the normal power mode signal to the power supply suppressing section 41. The power supply suppressing section 41 will supply the power to each section when the normal power mode signal is received. If the light emitting section locking mechanism 37 is activated, the control section 42 will deactivate it to release the lock of the reading light emitting section 13.

If the cassette 2 is determined to be the out-of-use state by the out-of-use determining section 43, the control section 42 will supply the low power consumption mode signal to the power supply suppressing section 41. When the low power consumption mode signal is inputted, the power supply suppressing section 41 will stop supplying the power to the image information detecting section 12, reading light emitting section 13, detecting section driving section 21, nonvolatile memory 24, X-ray buzzer 34, and matrix indicator 36, and continue supplying power to scan/readout section 22, volatile memory 23, control section 42, out-of-connection detecting section 44, release switch 32 and low power consumption mode indicator lamp 35. The control section 42 will cause the low power consumption mode indicator lamp 35 to be turned on, and the light emitting section locking mechanism 37 to be activated so that the reading light emitting section 13 is locked.

The power supply to the scan/readout section 22 and control section 42 is not necessarily the same as in the normal power mode. The power supply may be limited only to those circuits that require the power or desirable to be powered, and the power supply to the other circuits may be discontinued.

When the connecting terminal 9 is connected to the connecting terminal 33 and the out-of-connection signal is not outputted from the out-of-connection detecting section 44, the process will move forward from step 201 to step 205 and the cassette 2 will be determined to be the in-use state, and the normal power mode will be set as the power mode through the control operation described above.

Even when the connecting terminal 9 is disconnected from the connecting terminal 33 and out-of-connection signal is outputted from the out-of-connection signal detecting section 43, if the image information reading is in progress and the readout signal is outputted from the scan/readout section 22, the process will move forward from step 202 to step 205, so that the cassette 2 will be determined to be in-use state, and the normal power mode will be set.

Further, even when the connecting terminal 9 is disconnected from the connecting terminal 33, if the release switch 32 is depressed by the user, the release signal will be inputted to the out-of-use state detecting section 43 and the process will move forward from step 203 to step 205, so that the cassette 2 will be determined to be the in-use state and the normal power mode will be set.

Meanwhile, when the connecting terminal 9 is disconnected from the connecting terminal 33 and the out-of-connection signal is outputted from the out-of-connection detecting section 44, and the readout signal from the scan/readout section 22 and release signal from the release switch 32 are not outputted, that is, when the image information detecting cassette 2 is not used, the process will move forward sequentially from step 201 through step 202, step 203 to step 204, so that the cassette 2 will be determined to be the out-of-use state and the low power consumption mode will be set as the power mode, thereby the power consumption of the cassette 2 may be reduced.

As would be clear from the description above, in the image information detecting cassette 2 according to this embodiment, the image information detecting cassette 2 is determined to be the out-of-use state based on the detection of the unconnected state of the connecting terminal 9 with the connecting terminal 33 by the out-of-connection detecting section 44 configured to detect the unconnected state of the connecting terminal 9 with the connecting terminal 33, and the low power consumption mode will be set automatically, in which the power supply is suppressed, so that the power consumption may be reduced when the cassette 2 is not used such as the time when the cassette 2 is carried with the connecting terminal 9 disconnected from the connecting terminal 33 or the like. Further, while the image information reading is in progress, or when the release switch 32 is depressed by the user or the like, the image information detecting cassette 2 will be determined to be the in-use state and the normal power mode will be set, in which normal power is supplied. Thus, the low power consumption mode is prevented from being set while the image information reading is in progress, or when the low power consumption mode is not desired by the user, so that the usefulness of the image information detecting cassette 2 may be enhanced.

In this embodiment, the power mode is set based on the information whether the connecting terminal 9 for connecting the system controller that control the X-ray irradiating section and image information detecting cassette 2 is connected to the connecting terminal 33 of the cassette 2, but the usable connecting terminals for this purpose are not limited to the connecting terminals 9 and 33, and any connecting terminal may be used as long as it is normally connected to the cassette and disconnected when it is not used. For example, a terminal connected to an X-ray irradiating device for receiving the X-ray irradiation signal, or a terminal for receiving power from an external power source may be used. If the terminal for receiving power from an external power source is used, it is preferable that a built-in battery is separately provided for supplying power when this connecting terminal is disconnected.

Figure 10:
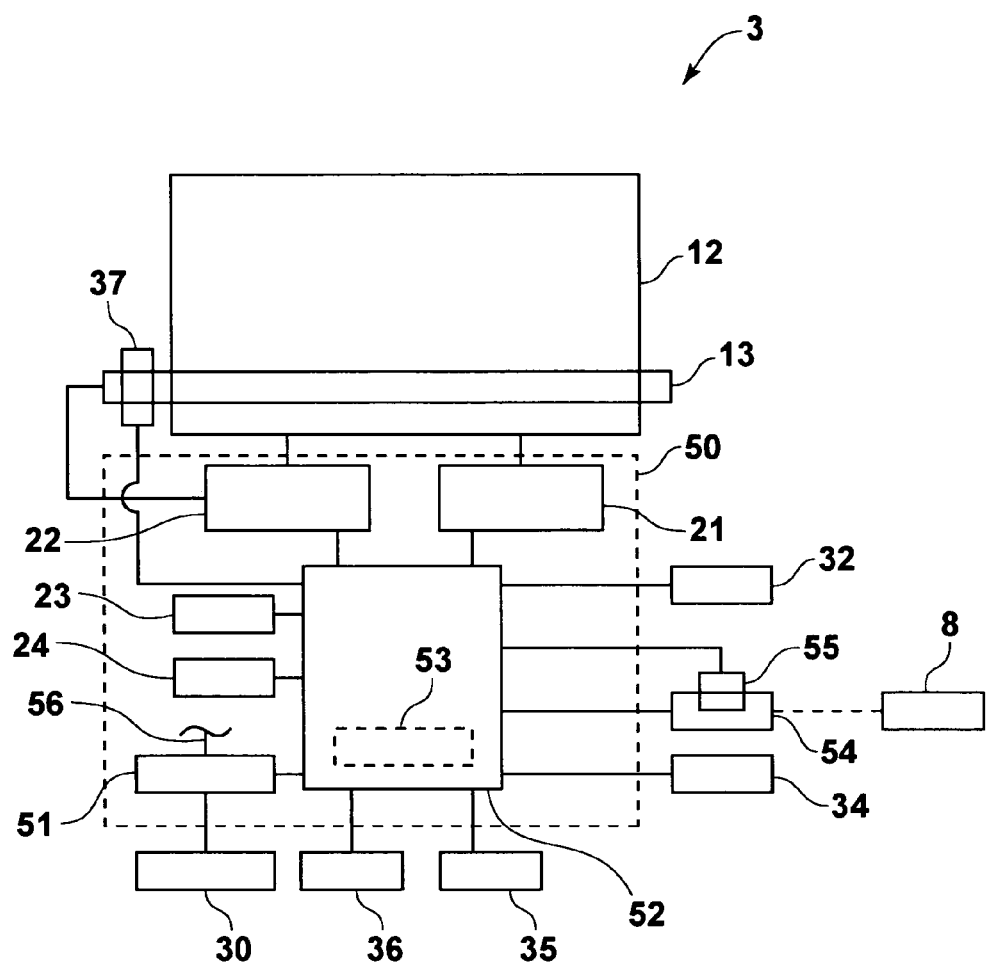
FIG. 10 is a configuration and circuit diagram of the relevant part of an image information detecting cassette according to a third embodiment of the present invention.

Hereinafter, an image information detecting cassette 3 according to a third embodiment of the present invention will be described with reference to FIG. 10. In FIG. 10, the element identical to that shown in FIG. 2 is given the same numeral and will not be elaborated upon further here unless otherwise specifically required. Also, the overview of the third embodiment will not be provided here since it is substantially identical to that of the first embodiment.

FIG. 10 is a configuration and circuit diagram of the relevant part of the image information detecting cassette 3. The control circuit section 50 has a detecting section driving section 21; a scan/readout section 22; a volatile memory 23; a detachable nonvolatile memory 24; a power supply suppressing section 51 for suppressing the power supply to each section when the low power consumption mode is selected; and a control section 52 connected to the detecting section driving section 21, scan/readout section 22, volatile memory 23, nonvolatile memory 24, and power supply suppressing section 51, and configured to control the operation of each section of the cassette 3.

The control section 52 has an out-of-use state determining section 53, and connected to a release switch 32, wireless communication section 54 for transmitting/receiving various data to/from a wireless communication section 8 connected to the system controller (not shown), X-ray buzzer 34, low power consumption mode indicator lamp 35, matrix indicator 36, light emitting section locking mechanism 37, and out-of-communication detecting section 55 configured to check to see if the communication between the wireless communication sections 54 and 8 is feasible, and if not, output an out-of-communication signal.

Prior to the X-ray imaging, various kinds of data, including an imaging menu, ID information, application voltage for the image recording, reading out speed and the like are inputted from the wireless communication section 8 of the system controller to the control section 52 through the wireless communication section 54. Also, an X-ray ready signal is inputted through the wireless communication section 54 to the control section 52 and out-of-use state determining section 53 during the time period from the time when the preparation for the X-ray irradiation is completed until the time after the X-ray is irradiated. Also, an X-ray irradiation signal is inputted through the wireless communication section 54 to the control section 52 when the X-ray is irradiated. Further, when the image information is readout, a readout signal is outputted from the scan/readout section 22 to the out-of-use state determining section 53.

The out-of-use state determining section 53 of the control section 52 is provided for determining whether the image information detecting cassette 3 is the out-of-use state or in-use state based on the release signal inputted from the release switch 32 and readout signal inputted from the scan/readout section 22, in addition to the out-of-communication signal inputted from the out-of-communication detecting section 55.

When the image information detecting cassette 3 is determined to be the in-use state by the out-of-use state determining section 53, the normal power mode will be set by the control section 52 as the power mode in which each section is powered, and if the image information detecting cassette 3 is determined to be the out-of-use state by the out-of-use state determining section 53, the low power consumption mode will be set by the control section 52 as the power mode in which only some of the sections are powered and the power supply to other sections is stopped. The control section 52 also assumes control of overall operation of the cassette 3.

The power is supplied through a power supply wiring 56, and the battery 30 together with the power supply wiring 56 serves as the power supplying means of the present invention.

Detailed description of the operation of the cassette 3 according to the third embodiment will not be provided here, since it is substantially identical to that of the cassette 2 according to the second embodiment except the out-of-communication detecting section 55 is used in the third embodiment instead of the out-of-connection detecting section 44.

In the third embodiment, the cassette 3 is determined to be in-use state when the communication between the wireless communication sections 54 and 8 is feasible and the normal power mode will be set as the power mode.

When the cassette 3 is moved to a place far apart from the wireless communication section 8, or when the wireless communication section 8 is switched off, the communication between the cassette 3 and the wireless communication section 8 will become infeasible and the out-of-communication signal will be outputted from the out-of-communication detecting section 55. But even in such a case, if image information reading is in progress, and the readout signal is outputted from the scan/readout section 22, the cassette 3 will be determined to be the in-use state and the normal power mode will be set as the power mode.

Further, if the user wishes to use the image information detecting cassette 3 under the circumstance where the communication between the two wireless communication sections 54 and 8 is infeasible, the user may depress the release switch 32 to input the release signal to the out-of-use state detecting section 53. By doing so, the cassette 3 will be determined to be the in-use state and the normal power mode will be set as the power mode.

Meanwhile, when the communication between the two wireless communication sections 54 and 8 is infeasible and the out-of-communication signal is outputted from the out-of-communication detecting section 55, and the readout signal from the scan/readout section 22 and release signal from the release switch 32 are not outputted, that is, when the image information detecting cassette 3 is not used, the cassette 3 will be determined to be the out-of-use state and the low power consumption mode will be set as the power mode, thereby the power consumption of the cassette 3 may be reduced.

As would be clear from the description above, in the image information detecting cassette 3 according to this embodiment, the image information detecting cassette 3 is determined to be the out-of-use state based on the detection of the out-of-communication state by the out-of-communication detecting section 54 configured to detect the out-of-communication state between the wireless communication sections 54 and 8, and the low power consumption mode will be set automatically, in which the power supply is suppressed, so that the power consumption may be reduced when the cassette 3 is not used, including the case where the cassette 3 is moved to a location where the communication between the two wireless communication sections 54 and 8 is infeasible or the like. Further, while the image information reading is in progress, or when the release switch 32 is depressed by the user or the like, the image information detecting cassette 3 will be determined to be the in-use state and the normal power mode will be set, in which normal power is supplied. Thus, the low power consumption mode is prevented from being set while the image information reading is in progress, or when the low power consumption mode is not desired by the user, so that the usefulness of the image information detecting cassette 3 may be enhanced.

Figure 11:
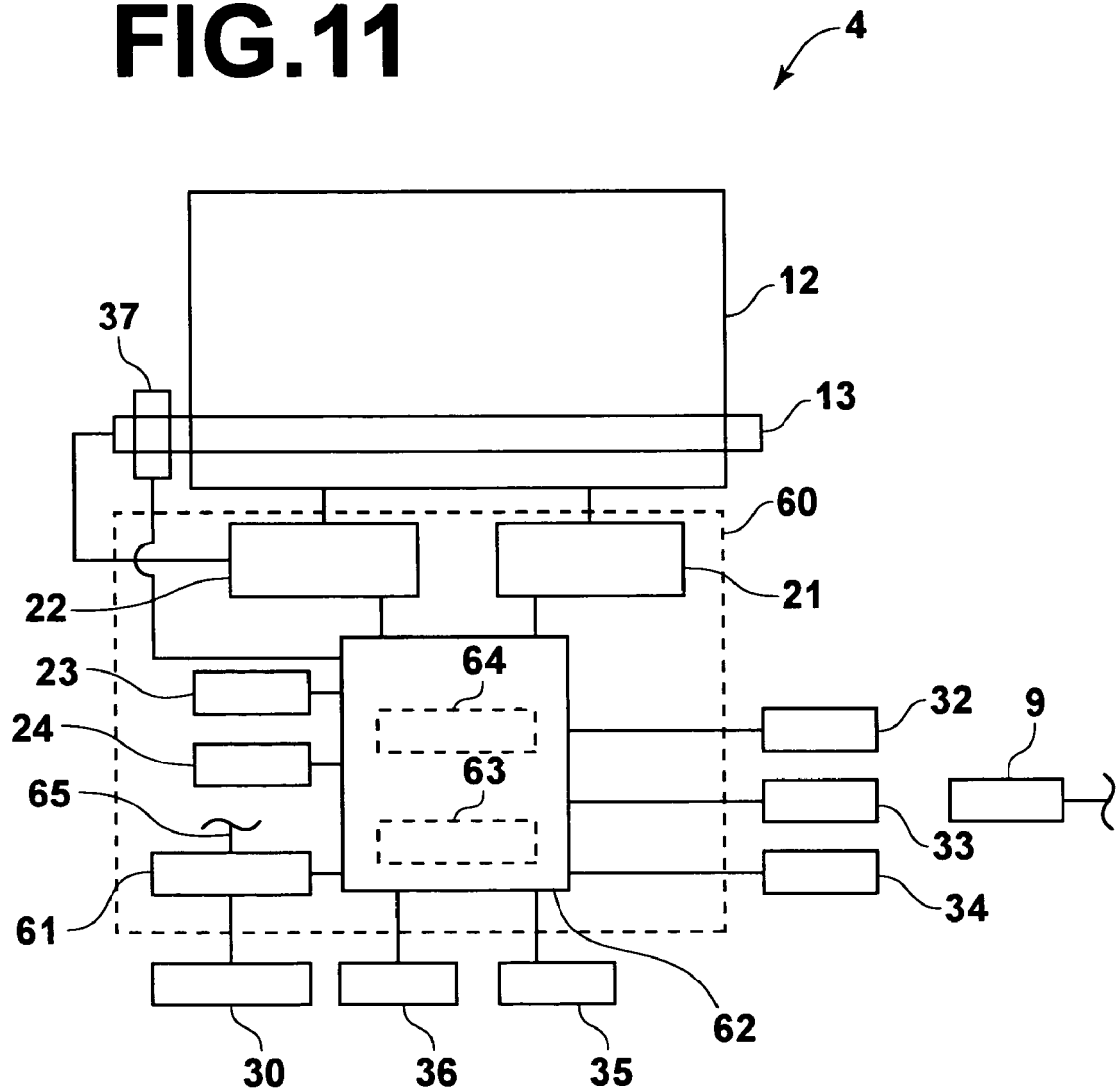
FIG. 11 is a configuration and circuit diagram of the relevant part of an image information detecting cassette according to a fourth embodiment of the present invention.

Hereinafter, an image information detecting cassette 4 according to a fourth embodiment of the present invention will be described with reference to FIG. 11. In FIG. 11, the element identical to that shown in FIG. 2 is given the same numeral and will not be elaborated upon further here unless otherwise specifically required. Also, the overview of the fourth embodiment will not be provided here, since it is substantially identical to that of the first embodiment. FIG. 11 is a configuration and circuit diagram of the relevant part of the image information detecting cassette 4. The control circuit section 60 has a detecting section driving section 21; a scan/readout section 22; a volatile memory 23; a detachable nonvolatile memory 24; a power supply suppressing section 11 for suppressing the power supply to each section when the low power consumption mode is selected; and a control section 62 connected to the detecting section driving section 21, scan/readout section 22, volatile memory 23, nonvolatile memory 24, and power supply suppressing section 61, and configured to control the operation of each section of the cassette 4.

The control circuit section 60 is connected to a detecting section driving section 21, scan/readout section 22, volatile memory 23, nonvolatile memory 24, and power supply suppressing section 61, and has a control section 62 for controlling the operation of each section of the cassette 4.

The control section 62 is connected to a release switch 32, connecting terminal 33, X-ray buzzer 34, low power consumption mode indicator lamp 35, matrix indicator 36, light emitting section locking mechanism 37, and time overrun detecting section 64 configured to measure the elapsed time from the immediately preceding irradiation time of X-ray and output a time overrun signal to an out-of-use state determining section 63 when the elapsed time exceeds a predetermined time.

Prior to the X-ray imaging, various kinds of data, including an imaging menu, ID information, application voltage for the image recording, reading out speed and the like are inputted from the system controller to the control section 62 through the connecting terminals 9 and 33. Also, an X-ray ready signal is inputted from the system controller to the control section 62 and out-of-use state detecting section 63 during the time period from the time when the preparation for the X-ray irradiation is completed until the time after the X-ray is irradiated, and an X-ray irradiation signal when the X-ray is irradiated.

The out-of-use state determining section 63 of the control section 62 is provided for determining whether the image information detecting cassette 4 is the out-of-use or in-use state based on the release signal inputted from the release switch 32 and X-ray ready signal inputted from the connecting terminal 33, in addition to the time overrun signal inputted from the time overrun detecting section 64.

When the image information detecting cassette 4 is determined to be the in-use state by the out-of-use state determining section 63, the normal power mode will be set by the control section 62 as the power mode in which each section is powered, and if the image information detecting cassette 4 is determined to be the out-of-use state by the out-of-use state determining section 63, the low power consumption mode will be set by the control section 42 as the power mode in which only some of the sections are powered and the power supply to other sections is discontinued. The control section 62 also assumes control of overall operation of the cassette 4.

Power supply wiring 65 is connected to the image information detecting section 12, reading light emitting section 13, detecting section driving section 21, scan/readout section 22, volatile memory 23, nonvolatile memory 24, control section 62, release switch 32, X-ray buzzer 34, low power consumption mode indicator lamp 35, matrix indicator 36 through the power supply suppressing section 61. In the normal power mode, the power is supplied from the battery 30 to each section through the power supply wiring 65. In FIG. 11, the interconnections of the power supply wiring 65 are not indicated for clarity. The battery 30 together with the power supply wiring 65 serves as the power supplying means of the present invention.

Figure 12:
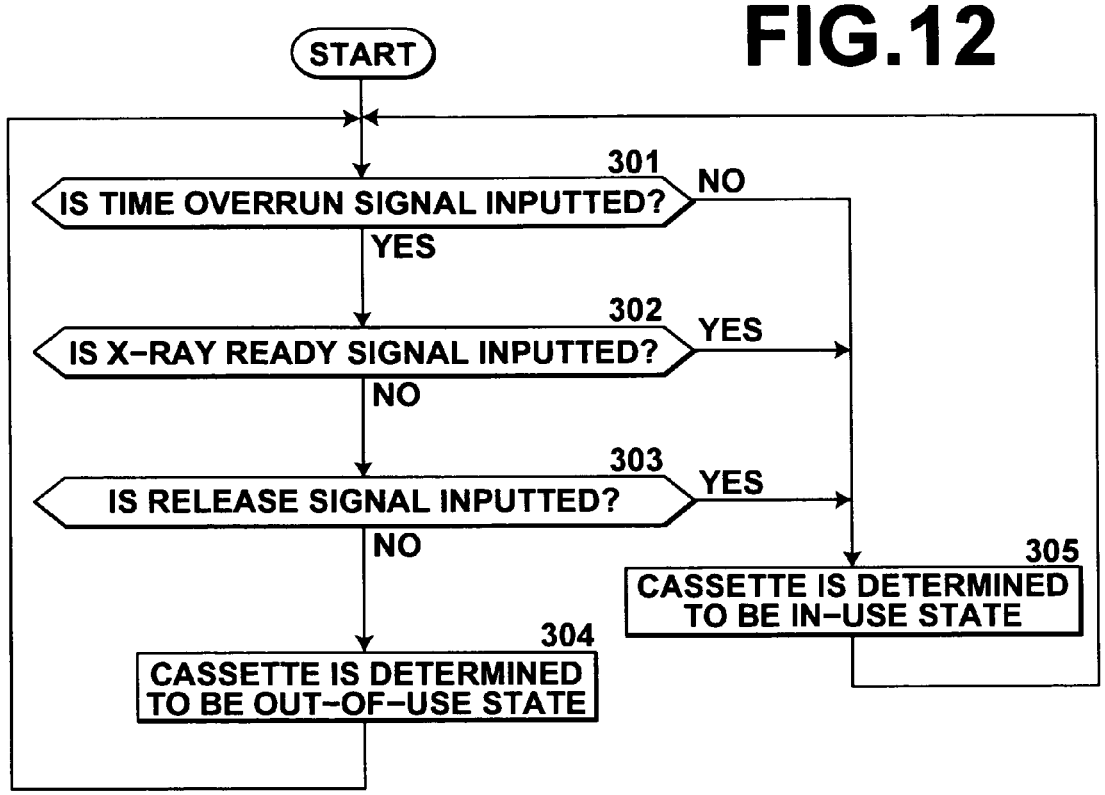
FIG. 12 is a flow diagram illustrating the operational flow of the image information detecting cassette shown in FIG. 11.

Hereinafter, the operation of the image information detecting cassette 4 of this embodiment will be described. Description of the image recording and reading out operation of the cassette 4 will not be provided here, since it is substantially identical to that of the cassette 1 of the first embodiment, and the power mode setting process will be described hereinafter. First, determination of in-use state by the out-of-use state determining section 63 will be described with reference to the flow diagram shown in FIG. 12.

In cases where ordinary X-ray imaging is implemented continuously, the predetermined time described above will be set such that it is not exceeded by the time period between one irradiation of X-ray to the next. Also, image information reading will be implemented within this predetermined time.

In step 301, determination is made as to whether the time overrun signal is inputted from the time overrun detecting section 64. If not, the process will move forward to step 305 to determine that the cassette 4 is in-use state, and if inputted, it will move to step 302. In step 302, determination is made as to whether the X-ray ready signal is inputted from the system controller. If inputted, the process will move forward to step 305, and if not, it will move forward to step 303.

In step 303, determination is made as to whether the release signal is inputted from the release switch 32. If inputted, the process will move forward to step 305, and if not, it will move forward to step 304.

In step 304, the cassette 4 is determined to be the out-of-use state by the detecting section 63 and the result will be outputted to the control section 62, and thereafter, the process will return to step 301.

In step 305, the cassette 4 is determined to be the out-of-use state by the detecting section 63 and the result will be outputted to the control section 62, and thereafter, the process will return to step 301.

When the cassette 4 is determined to be the in-use state by the out-of-use determining section 63 through the determination process described above, the control section 62 will supply the normal power mode signal to the power supply suppressing section 61. The power supply suppressing section 61 will supply the power to each section when the normal power mode signal is received. If the light emitting section locking mechanism 37 is activated, the control section 62 will deactivate it to release the lock of the reading light emitting section 13.

If the cassette 4 is determined to be the out-of-use state by the out-of-use determining section 63, the control section 62 will supply the low power consumption mode signal to the power supply suppressing section 61. The power supply suppressing section 61 will stop supplying the power to the image information detecting section 12, reading light emitting section 13, detecting section driving section 21, nonvolatile memory 24, X-ray buzzer 34, and matrix indicator 36, and continue supplying power to scan/readout section 22, volatile memory 23, control section 62, release switch 32 and low power consumption mode indicator lamp 35. The control section 62 will cause the low power consumption mode indicator lamp 35 to be turned on, and the light emitting section locking mechanism 37 to be activated so that the reading light emitting section 13 is locked.

The power supply to the scan/readout section 22 and control section 62 is not necessarily the same as in the normal power mode. The power supply may be limited only to those circuits that require the power or desirable to be powered, and the power supply to the other circuits may be discontinued.

When the elapsed time from the immediately preceding irradiation time of X-ray is determined not to be exceeding the predetermined time through the control operation described above, the cassette 4 will be determined to be the in-use state, and the normal power mode will be set as the power mode.

Even when the elapsed time from the immediately preceding irradiation time of X-ray exceeds the predetermined time, if the X-ray ready signal is inputted, or if the release switch is depressed by the user, the process will move forward to step 305, so that the cassette 4 will be determined to be the in-use state and the normal power mode will be set as the power mode.

Meanwhile, when the elapsed time from the immediately preceding irradiation time of X-ray exceeds the predetermined time and time overrun signal is outputted from the time overrun detecting section 64, and the X-ray ready signal from the system controller and release signal from the release switch 32 are not outputted, that is, when the image information detecting cassette is not used, the process will move forward sequentially from step 301 through 302, step 303 to step 304, so that the cassette 4 will be determined to be the out-of-use state and the low power consumption mode will be set as the power mode, thereby the power consumption of the cassette 4 may be reduced.

As would be clear from the description above, in the image information detecting cassette 4 according to this embodiment, the image information detecting cassette 4 will be determined to be the out-of-use state based on the detection of the overrun of the elapsed time over a predetermined time by the time overrun detecting section 64 configured to detect the overrun of the elapsed time from the immediately preceding irradiation time of X-ray over a predetermined time, and the low power consumption mode will be set automatically, in which the power supply is suppressed, so that the power consumption may be reduced when the cassette 4 is not used over a prolonged time period or the like. Further, when the X-ray ready signal is inputted, or when the release switch 32 is depressed by the user or the like, the image information detecting cassette 4 will be determined to be the in-use state and the normal power mode will be set, in which normal power is supplied. Thus, the low power consumption mode is prevented from being set when the X-ray ready signal is inputted, or when the low power consumption mode is not desired by the user, so that the usefulness of the image information detecting cassette 4 may be enhanced.

In the embodiments described above, the power supply to the scan/readout section 22 is maintained when the low power consumption mode is set, but it may also be discontinued. Further, the power supply to the detection-section driving section 21 is discontinued in the embodiments described above, it may be maintained if the power supply to the scan/readout section 22 is reduced or discontinued. That is, at least part of the power supply to scan/readout section 22 or detection section driving section 21 may be reduced to achieve low power consumption. Further, when the image information detecting cassette is in the low power consumption mode, the low power consumption indicator lamp is turned on, so that the user may readily recognize that the cassette is in low power consumption mode in which the power supply is suppressed. In addition, when the cassette is in the low power consumption mode, the reading light emitting section 13 is locked by the light emitting section locking mechanism 37, so that the likelihood of damages of the reading light emitting section 13 by the vibration during transportation may be reduced. Preferably, the reading light emitting section 13 is also locked by the light emitting section locking mechanism 37 when the power of the cassette is switched off.

Further, in the embodiments described above, the power supply suppressing section is described as a separate unit, but it is not limited to this. It may be, for example, provided in the control section, or it may be distributed to each section of the cassette. That is, the configuration of the power supply suppressing section may be of any form as long as it is capable of suppressing the power to be supplied to desired sections. Further, the image information detecting cassette of the present invention may be embodied by combining the embodiments described above as appropriate.

In the embodiments described above, the image information detecting section 12 of a direct conversion optical reading system is used as the image information detecting section, but it is not limited to this. An image information detecting section of indirect conversion system may also be used, wherein the fluorescence emitted from a fluorescent material when irradiated by the recording light is emitted on the recording photoconductive layer, and signal charges obtained through the photoelectrical conversion of the fluorescent emitted on the photoconductive layer are stored. Further, an image information detecting section configured to read out charges generated in the photoconductive layer that takes on conductivity when irradiated by the recording light by scan driving TFTs may also be used.

Figure 13:
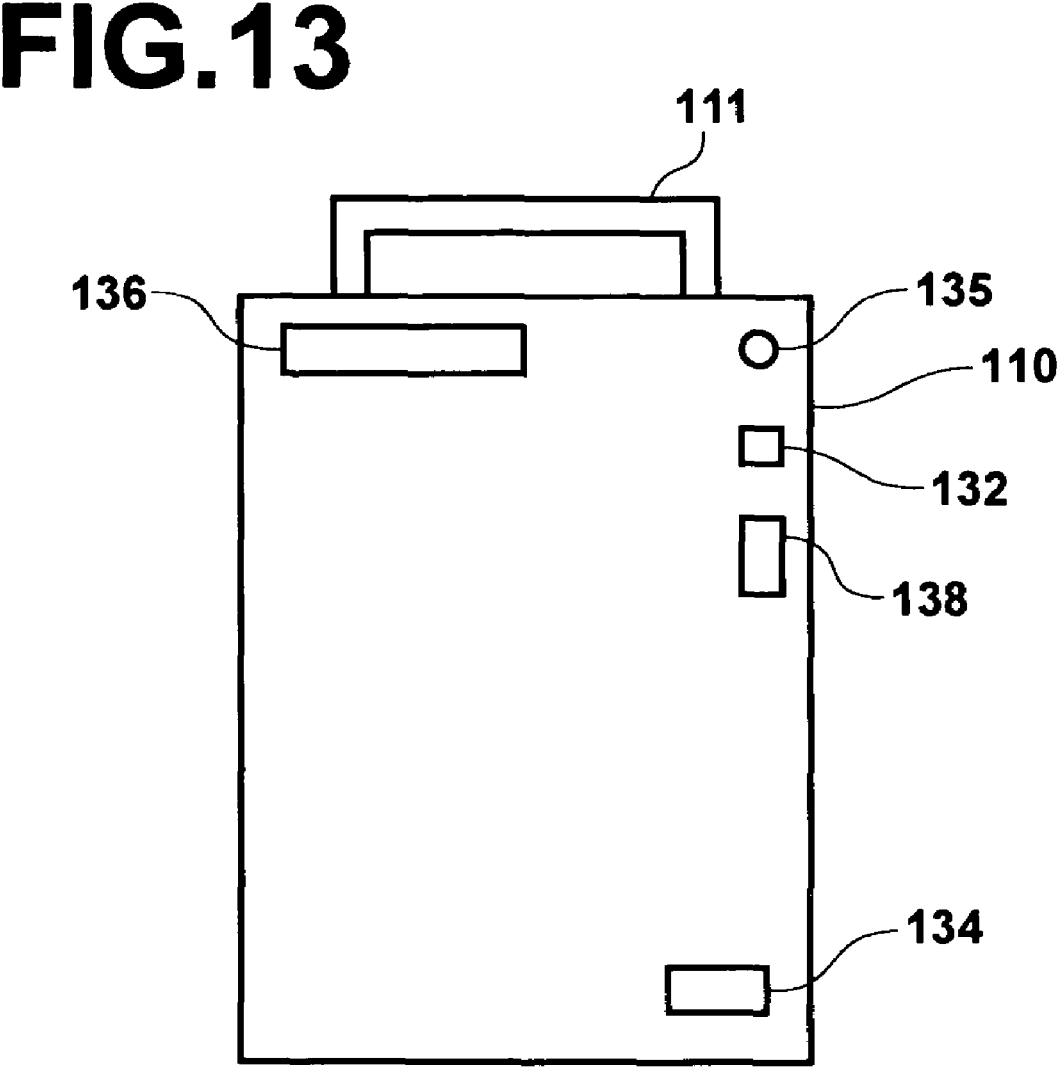
FIG. 13 is an overview of an image information detecting cassette according to a fifth embodiment of the present invention.
Figure 14:
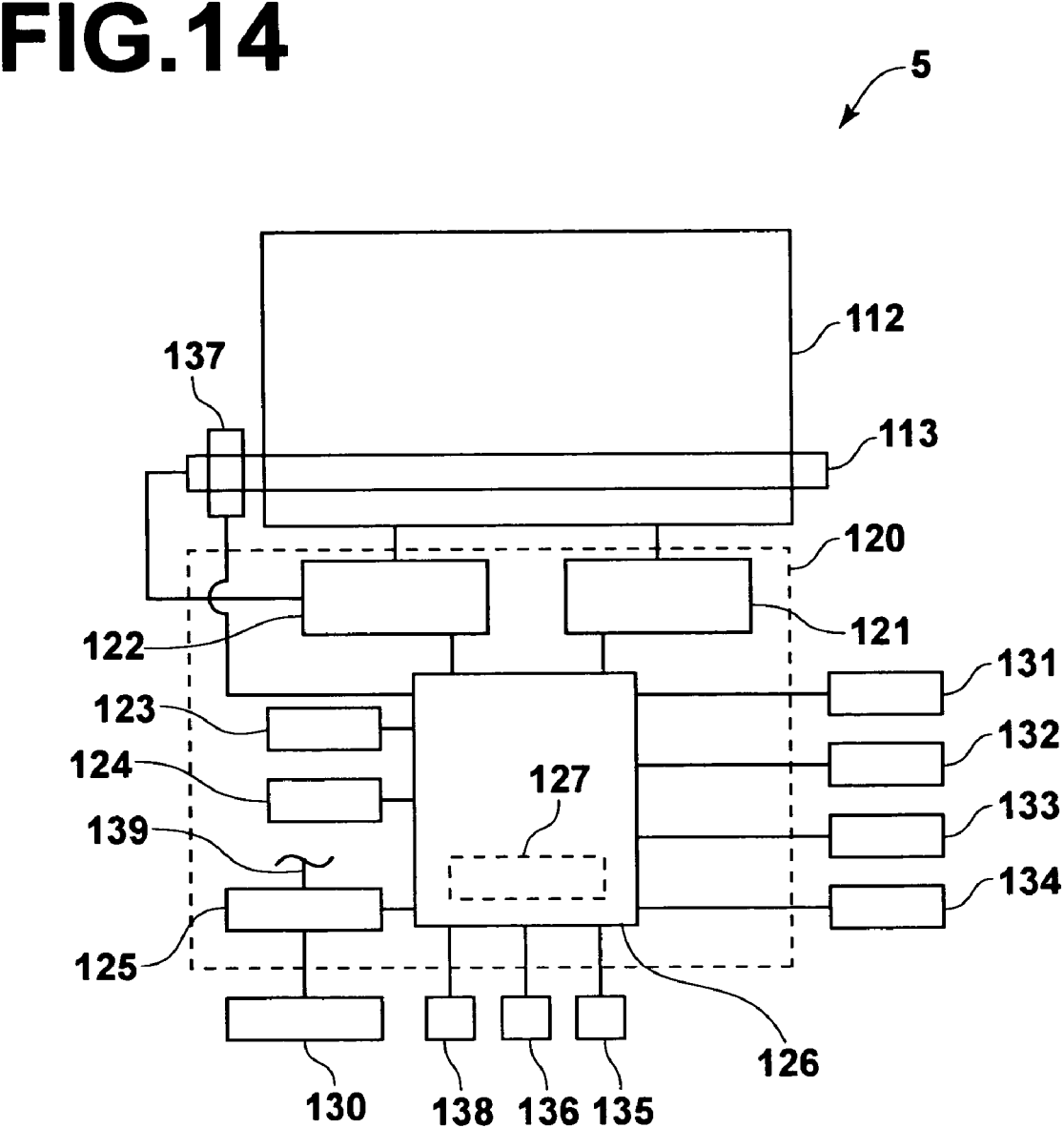
FIG. 14 is a configuration and circuit diagram of the relevant part of the image information detecting cassette shown in FIG. 13.

Hereinafter, an image information detecting cassette 5 according to a fifth embodiment of the present invention will be described with reference to FIGS. 13 and 14. FIG. 13 is an overview of an image information detecting cassette 5 according to a fifth embodiment of the present invention, and FIG. 14 is a configuration and circuit diagram of the relevant part of the image information detecting cassette 5. The image information detecting cassette 5 is intended for use in medical X-ray imaging, and comprises a case 110 substantially rectangular solid and containing an image information detecting section 112, reading light emitting section 113, control circuit section 120 and battery 130 therein; and a handle 111 attached to the case 110.

The image information detecting section 112 is configured to record image information carried by X-ray by storing charges generated therein as the charges of the latent image when exposed to the X-ray which is the recording light transmitted through the subject. The image information detecting section 112 has a set of layers layered in the order of a first electrode layer configured to transmit X-ray; a recording photoconductive layer configured to take on conductivity when exposed to X-ray; a charge transport layer configured to act as an insulator against the charges of the latent image and as a conductor for the transport charges having opposite polarity to that of the charges of the latent image; a reading photoconductive layer configured to take on conductivity when exposed to reading light; and a second electrode layer configured to transmit the reading light.

When recording image information, a high voltage is applied between the first and second electrode layers and X-ray is irradiated from the side of the first electrode layer with the electric fields being applied, and an amount of charges proportional to the dose of the X-ray irradiated thereon is stored in a storage section formed substantially at the interface between the recording photoconductive layer and charge transport layer. When reading out the image information, the image information detecting section 112 is scanned with the reading light emitted from the reading light emitting section 113, and the image information recorded in the image information detecting section 112 is read out.

The control circuit section 120 has a detecting section driving section 121 configured to apply a high voltage to the image information detecting section 112 when image information is recorded; a scan/readout section 122 configured to perform optical scanning over the image information detecting section 112 with the reading light emitting section 113 and read out image signals in accordance with the image information recorded in the image information detecting section 112; a volatile memory 123 which is primarily used as a buffer memory; a detachable nonvolatile memory 124; a power supply control section 125 connected to a battery 130 and configured to control the power to be supplied to each section in accordance with a selected power supply mode; and a control section 126 connected to the detecting section driving section 121, scan/readout section 122, volatile memory 123, nonvolatile memory 124 and power supply control section 125, and configured to control the operation of each section. The scan/readout section 122 together with the reading light emitting section 113 serves as the reading out means of the present invention.

The control section 126 has a state determining section 127, and connected to an acceleration sensor 131, release switch 132 configured to output a release signal to the control section 126 when depressed by the user, a connecting terminal 133 connected to a connecting terminal of a cable connected to a system controller (not shown), X-ray buzzer 134 configured to give an alarm when X-ray is irradiated, low power consumption mode indicator lamp 135 configured to indicate that the image information detecting cassette 5 is in the low power consumption mode which will be described hereinafter, matrix indicator 136 configured to indicate requisite information such as, for example, the indication that notifies that the X-ray is ready to be irradiated and the like, light emitting section locking mechanism 137 configured to lock the reading light irradiating section 113 as required, and power supply inhibit mode indicator 138 for indicating that the cassette 5 is in the power supply inhibit mode which will be described hereinafter. As for the release switch 132, a switch with a displaying function that turns on when the switch is depressed is used.

Prior to the X-ray imaging, various kinds of data, including an imaging menu, ID information, application voltage for the image recording, reading out speed and the like are inputted from the system controller to the control section 126 through the connecting terminal 133. Also, an X-ray ready signal is inputted from the system controller to the control section 126 during the time period from the time when the preparation for the X-ray irradiation is completed until the time after the X-ray is irradiated, and an X-ray irradiation signal when the X-ray is irradiated. When the image information is readout, a readout signal is outputted from the scan/readout section 122 to the control section 126.

The state determining section 127 of the control section 126 determines whether the image information detecting cassette 5 is the out-of-use state, in-use state, or abnormal acceleration state based on the acceleration signal inputted from the acceleration sensor 131, release signal inputted from the release switch 132, X-ray ready signal inputted from the connecting terminal 133, and readout signal inputted from the scan/readout section 122.

When the image information detecting cassette 5 is determined to be the in-use state by the state determining section 127, the normal power mode will be set by the control section 126 as the power mode in which all the necessary sections are powered, if it is determined to be the out-of-use state, the low power consumption mode will be set as the power mode in which only some of the sections are powered and the power supply to the other sections is stopped, and if it is determined to be the abnormal acceleration state, the power supply inhibit mode will be set as the power mode in which the power supply to all the sections is stopped. The control section 126 also assumes control of overall operation of the cassette 5.

The battery 130 is connected to the power supply control section 125. Power supply wiring 139 extends from the power supply control section 125 to the image information detecting section 112, reading light emitting section 113, detecting section driving section 121, scan/readout section 122, volatile memory 123, nonvolatile memory 124, control section 126, acceleration sensor 131, release switch 132, X-ray buzzer 134, low power consumption mode indicator lamp 135, and matrix indicator 136. In the normal power mode, the power is supplied from the battery 130 to each section through the power supply control section 125. In FIG. 14, the interconnections of the power supply wiring 139 are not indicated for clarity. The state determining section 127 serves as both the abnormal acceleration state determining means and out-of-use state determining mean of the present invention. The power supply control section 125 serves as the power supply inhibiting means and power supply suppressing means of the present invention.

Hereinafter, the operation of the image information detecting cassette 5 of this embodiment will be described. First, the image information recording and reading out operation will be described. Prior to the X-ray imaging, various kinds of data, including an imaging menu, ID information, application voltage for the image recording, reading out speed and the like are inputted from the system controller (not shown) to the control section 126 through the connecting terminal 133. The control section 126 will store these data in the nonvolatile memory 124 and read out for use as required. Such data may be prerecorded in a detachable nonvolatile memory 124 which will then be attached to the image information detecting cassette 5 to read out the data as required.

An X-ray ready signal is inputted to the control section 126 from the system controller (not shown) through the connecting terminal 133 during the time period from the time when the preparation for the X-ray irradiation is completed until the time after the X-ray is irradiated. Further, an X-ray irradiation signal is inputted to the control section 126 when X-ray is irradiated.

When the X-ray ready signal is inputted to the control section 126, a recording high voltage will be applied to the image information detecting section 112 by the control section 126 through control of the detecting section driving section 121. At the same time, the control section 126 will cause the X-ray ready state to be displayed on the matrix indicator 136.

Then, the X-ray is irradiated from the X-ray irradiating section (not shown) through control of the system controller. The X-ray transmitted through the subject is irradiated on the image information detecting section 112, where an amount of charges in accordance with the dose of X-ray is stored as the charges of the latent image. Also, the control section 126 will cause an audible alarm for notifying the X-ray irradiation to be given by the X-ray buzzer 134 when the X-ray is irradiated.

When reading out the image information, the control section 126 controls the scan/readout section 122 to scan the image information detecting section 112 with the reading light emitted from the reading light emitting section 113 and read out the image information recorded in the image information detecting section 112.

Figure 15:
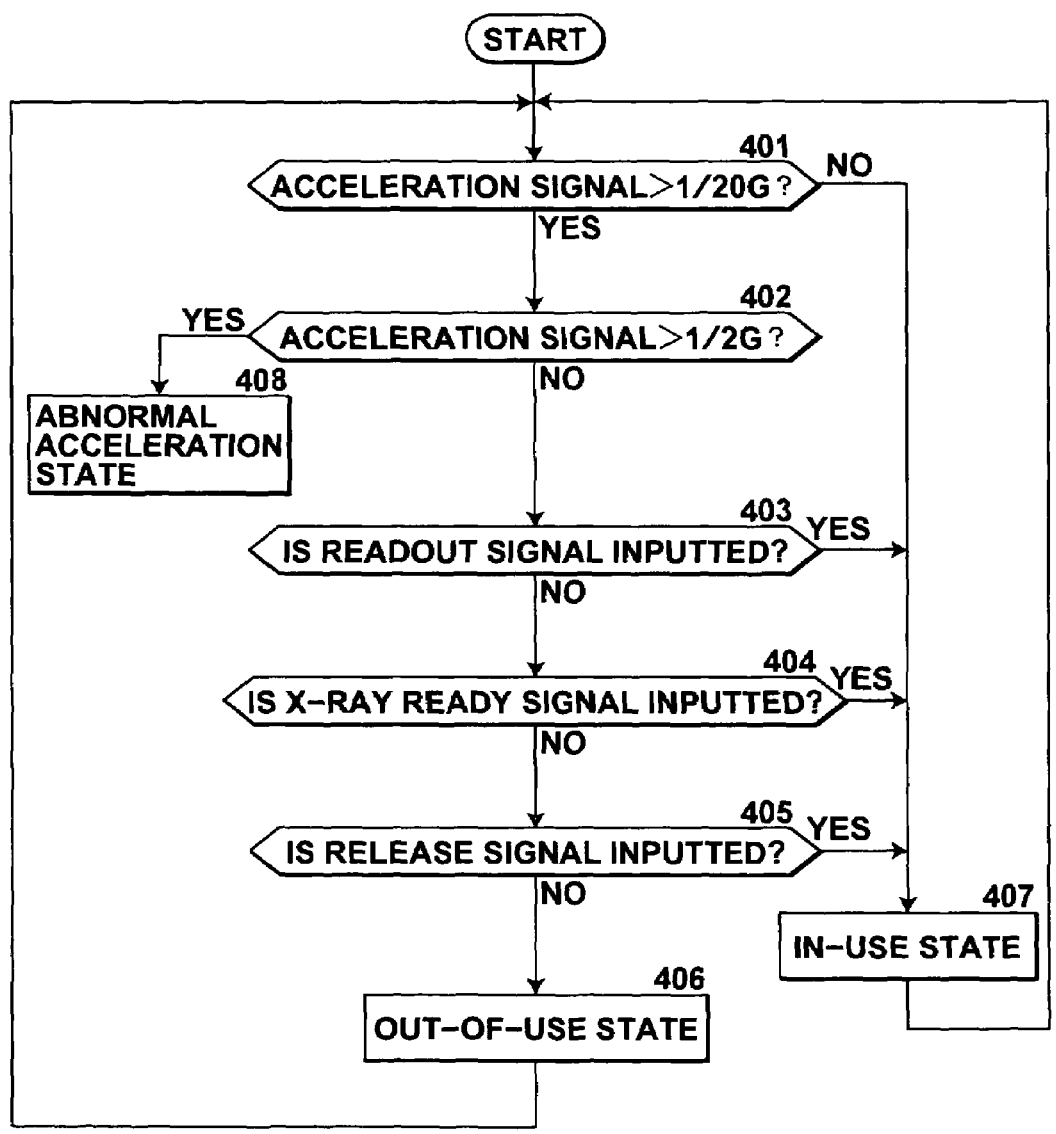
FIG. 15 is a flow diagram illustrating the operational flow of the image information detecting cassette shown in FIG. 13.

Next, power mode setting process will be described. First, state determining operation by the state determining section 127 will be described with reference to the flow diagram shown in FIG. 15.

In step 401, determination is made as to whether the acceleration signal indicating that the acceleration of the cassette 5 is greater or equal to the out-of-use acceleration of 1/20·G (gravitational constant) is received. If not, the process will move forward to step 407 and the cassette 5 will be determined to be in-use state, and if inputted, it will move forward to step 402. In step 402, determination is made as to whether the acceleration signal received is greater than or equal to the dangerous acceleration of 1/2·G (gravitational constant). If the acceleration signal is greater than 1/2·G, the process will move forward to step 408, and the acceleration signal will be determined to be the abnormal acceleration. If the acceleration signal is less than or equal to 1/2·G, process will move forward to step 403.

In step 403, determination is made as to whether the readout signal is inputted from the scan/readout section 122. If inputted, the process will move forward to step 407, and if not, it will move forward to step 404.

In step 404, determination is made as to whether the X-ray ready signal is inputted from the external system controller. If the X-ray ready signal is inputted, the process will move forward to step 407, and if not, it will move forward to step 405.

In step 405, determination is made as to whether the release signal is inputted from the release switch 132. If inputted, the process will move forward to step 407, and if not, it will move forward to step 406.

In step 406, the cassette 5 is determined to be the out-of-use state by the state determining section 127, and the result will be outputted to the control section 126. Thereafter, the process will return to step 401. In step 408, the cassette 5 is determined to be the abnormal acceleration state.

When the cassette 5 is determined to be the in-use state by the state determining section 127 through the determination process described above, the control section 126 will select the normal power mode as the power mode and supply a normal power mode signal to the power supply control section 125. The power supply control section 125 will supply the power to each section. If the light emitting section locking means 137 is activated, the control section 126 will deactivate it to release the lock of the reading light emitting section 113. When the release switch 132 is depressed, it will light up to notify that the release switch 132 is depressed.

If the cassette 5 is determined to be the out-of-use state by the state determining section 127, the control section 126 will select the low power consumption mode as the power mode, and supply the low power consumption mode signal to the power supply control section 125. The power supply control section 125 will stop supplying the power to the image information detecting section 112, reading light emitting section 113, detecting section driving section 121, nonvolatile memory 124, X-ray buzzer 134, and matrix indicator 136, while continue supplying the power to scan/readout section 122, volatile memory 123, control section 126, acceleration sensor 131, release switch 132, and low power consumption mode indicator lamp 135. The control section 126 will cause the low power consumption mode indicator lamp 35 to be turned on, and the light emitting section locking mechanism 137 to be activated so that the reading light emitting section 113 is locked.

The power supply to the scan/readout section 122 and control section 126 is not necessarily the same as in the normal power mode. The power may be supplied only to the circuits necessary for maintaining the low power consumption mode, or in addition to these circuits, it may be supplied only to those desirable to be kept operational, such as those that require a longer rising time so that the cassette may immediately return to the normal power mode when the low power consumption mode is changed. For other circuits, the power supply may be discontinued.

If the cassette 5 is determined to be in the abnormal acceleration state by the state determining section 127, the control section 126 will select the power supply inhibit mode as the power mode. First, the control section 126 will cause the power supply inhibit mode indicator 138 to set the power supply inhibit mode, nonvolatile memory 124 to store the acceleration signal value, and light emitting section locking mechanism 137 to lock the reading light emitting section 113 if it is not locked. Thereafter, it will supply the power supply inhibit mode signal to the power supply control section 125. The power supply control section 125 will electrically disconnect the battery 130 from the power supply wiring 139 to stop supplying the power to all the sections. Once the battery is electrically disconnected from the power supply wiring 139, they will not be reconnected automatically and predetermined manual operation is needed in order to reconnect them.

If the acceleration signal greater than or equal to $1/20 \cdot G$ is not outputted from the acceleration sensor 131, the process will move forward from step 401 to step 407 and the cassette 5 will be determined to be in-use state by the state determining section 127 and the normal power mode will be set as the power mode through the power supply control operation described above.

Even when the acceleration signal greater than or equal to $1/20 \cdot G$ and not greater than $1/2 \cdot G$ is outputted from the acceleration sensor 131, if the image information reading is in progress and the readout signal is outputted from the scan/readout section 122, the process will move forward from step 403 to step 407, so that the cassette 5 will be determined to be in-use state by the state determining section 127, and the normal power mode will be set as the power mode.

Further, even when the acceleration signal greater than or equal to $1/20 \cdot G$ and not greater than $1/2 \cdot G$ is outputted from the acceleration sensor 131, if the cassette 5 is in the preparatory process for X-ray irradiation and the X-ray ready signal is outputted from the external system controller, the process will move forward from step 404 to step 407, so that the cassette 5 will be determined to be the in-use state by the state determining section 127 and the normal power mode will be set as the power mode. Thus, the power mode switching from the normal power mode to the low power consumption mode arising from the slight vibration of the cassette 5 may be prevented when it is used.

Still further, even when the acceleration signal greater than or equal to $1/20 \cdot G$ and not greater than $1/2 \cdot G$ is outputted from the acceleration sensor 131, if the release switch 132 is depressed by the operator and the release signal is inputted to the control section 126, the process will move forward from step 405 to step 407, so that the cassette 5 will be determined to be the in-use state by the state determining section 127, and the normal power mode will be set as the power mode.

That is, even when the acceleration signal (greater than or equal to $1/20 \cdot G$ and not greater than $1/2 \cdot G$) is outputted from the acceleration sensor 131, if the image information reading is in progress, the cassette 5 is in the preparatory process for X-ray irradiation, or the release switch 132 is depressed, the cassette 5 will be determined to be the in-use state and the normal power mode will be set in which the normal power is supplied, so that the power mode switching to the low power consumption mode may be prevented when the cassette 5 is used.

When the acceleration signal greater than or equal to $1/20 \cdot G$ and not greater than $1/2 \cdot G$ is outputted from the acceleration sensor 131, and readout signal from the scan/readout section 122, the X-ray ready signal from the external system controller and release signal from the release switch 132 are not outputted, that is, when the image information detecting cassette 5 is not used such as the time when it is carried, the process will move forward from step 401 through step 402, step 403, step 404, step 405 to step 406, so that the cassette 5 will be determined to be the out-of-use state by the state determining section 127, and the low power consumption mode will be set as the power mode, thereby the power consumption of the cassette 5 may be reduced.

In the mean time, if the cassette 5 is dropped by the operator or a similar event is happening, the acceleration signal greater than $1/2 \cdot G$ will be outputted from the acceleration sensor 131, and the process will move forward from step 402 to step 408, thereby the cassette 5 will be determined to be the abnormal acceleration state by the state determining section 127, and the power inhibit mode will be set as the power mode. Thus, the power supply to each section will be inhibited before the cassette 5 is crashed on the floor.

As would be clear from the description above, according to the image information detecting cassette 5, when the abnormal acceleration of greater than or equal to $1/2 \cdot G$ is detected by the acceleration sensor 131, that is, when an abnormal state is happening such as the case when the cassette 5 is dropped or the like, the power inhibit mode will be selected and the battery 130 will be electrically disconnect from the power supply wiring 139 to discontinue the power supply to each section. Thus, the detecting section driving section 121 is deactivated, so that even when the cassette 5 is damaged by the crashing, undesirable high voltages are not applied to the image information detecting section 112, thereby safety of the operator may be enhanced. The battery 130 is electrically disconnected from the power supply wiring 139, so that other circuits are not powered, thereby the safety of the operator may further be ensured.

Further, when the power inhibit mode is selected, it will be displayed on the power supply inhibit mode indicator 138, so that the operator may readily recognize that the power supply is inhibited.

Still further, when the acceleration detected by the acceleration sensor 131 is greater than or equal to 1/20·G and not greater than 1/2·G, that is, when the cassette 5 is carried or the like, power consumption of the cassette 5 may be reduced. In cassette 5, 1/20·G and 1/2·G are used as the out-of-use acceleration level and dangerous acceleration level respectively, but any acceleration level may be used in accordance with the conditions under which the cassette is used. Further, in this embodiment, if the acceleration is less than or equal to 1/20·G, the cassette is immediately determined to be the in-use state. But, it may be configured, for example, such that once it is determined to be the out-of-use state, it will remain in the out-of-use state until after a predetermined time, e.g., for two seconds after the subsequent change in acceleration to less than or equal to 1/20·G. If such is the case, even when the acceleration of the cassette becomes less than 1/20·G for one second while it is being carried, the power mode is not switched to the normal power mode during that time period, thereby power consumption of the cassette may be further reduced.

Figure 16:
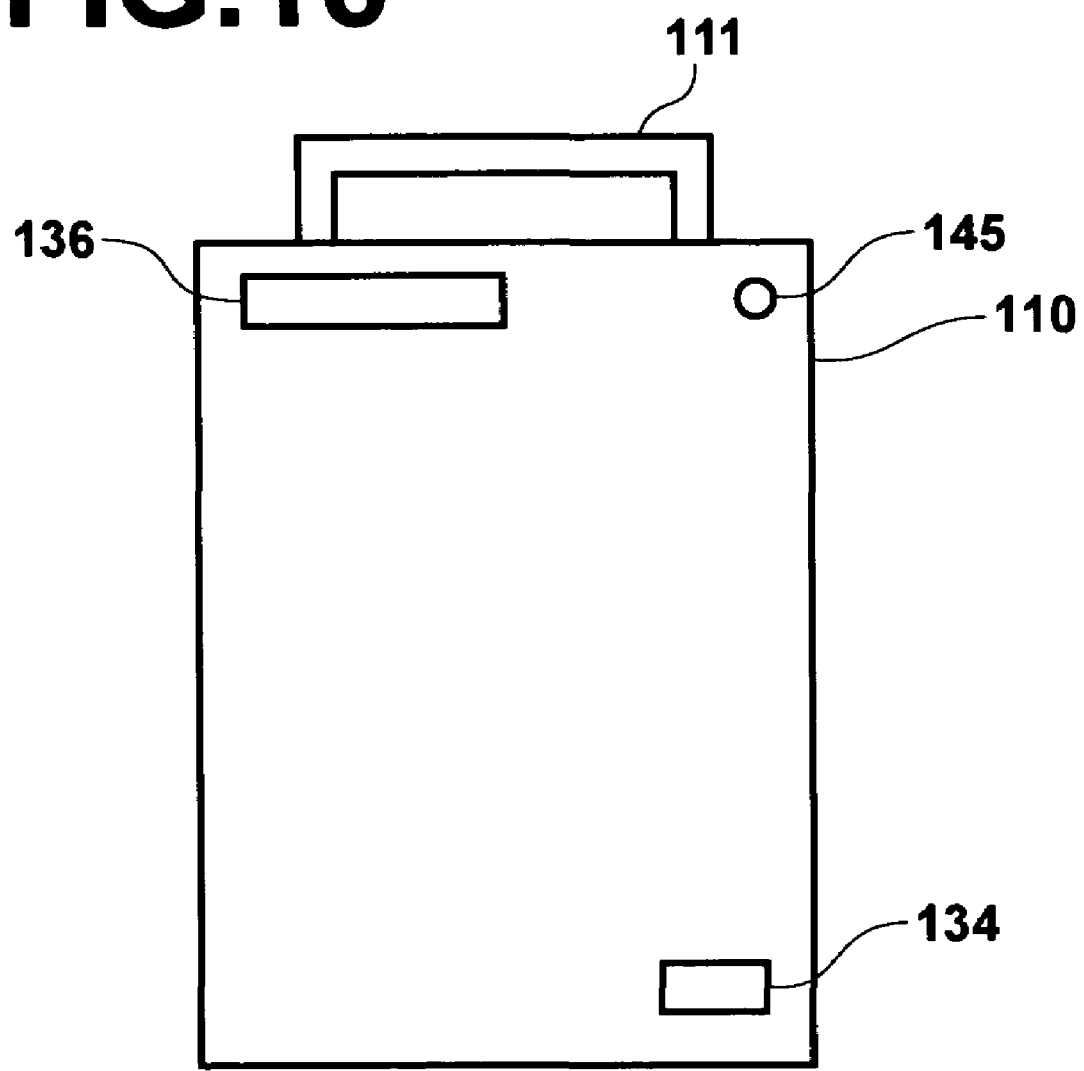
FIG. 16 is an overview of an image information detecting cassette according to a sixth embodiment of the present invention.
Figure 17:
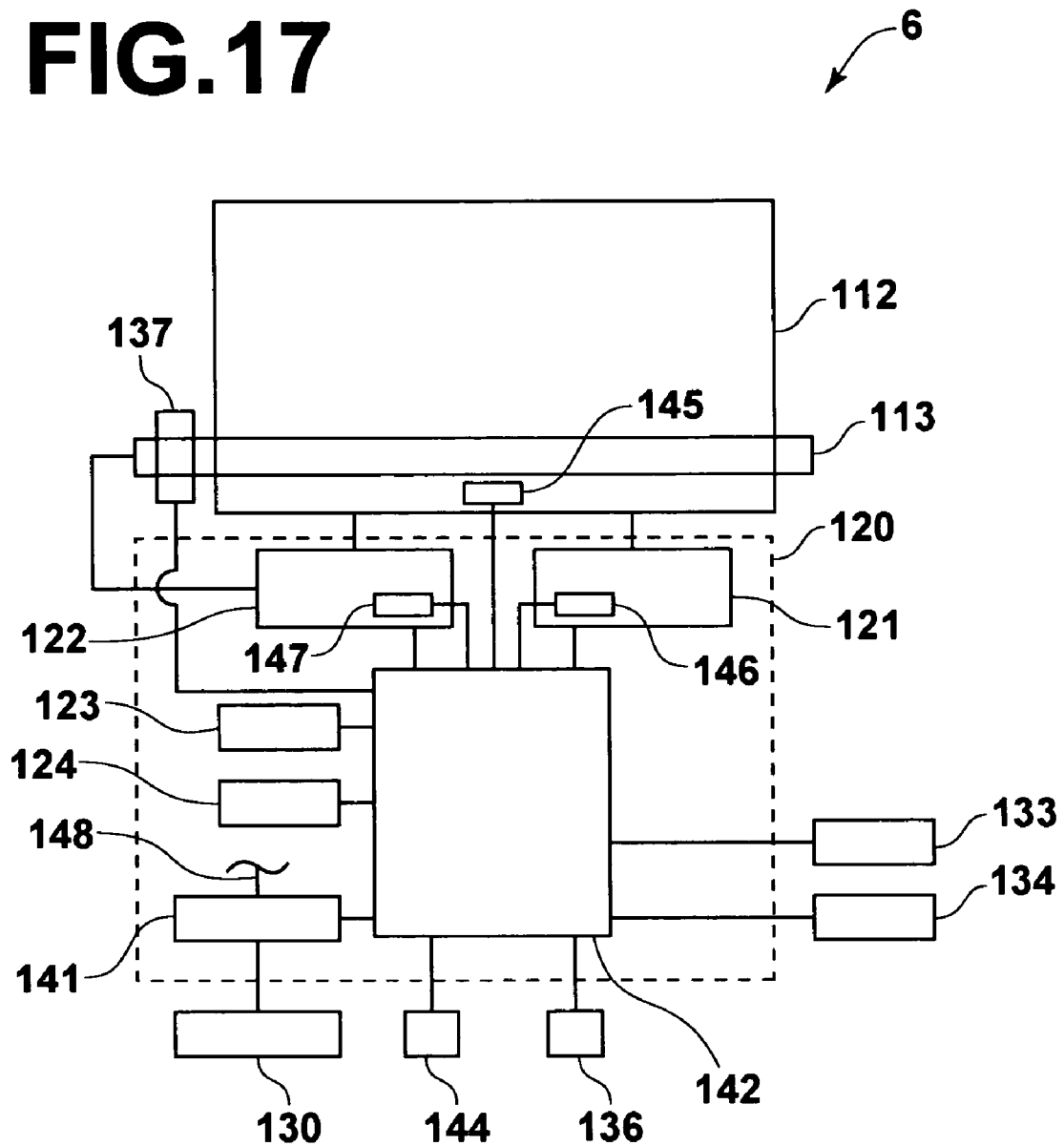
FIG. 17 a configuration and circuit diagram of the relevant part of the image information detecting cassette shown in FIG. 16.

Hereinafter, an image information detecting cassette 6 according to a sixth embodiment of the present invention will be described with reference to FIGS. 16 and 17. FIG. 16 is an overview of the image information detecting cassette 6 of the present invention. FIG. 17 is a configuration and circuit diagram of the relevant part of the image information detecting cassette 6. In FIG. 16 or 17, the element identical to that shown in FIG. 13 or 14 is given the same numeral and will not be elaborated upon further here unless otherwise specifically required.

The control circuit section 140 has a detecting section driving section 121; a scan/readout section 122; a volatile memory 123; a detachable nonvolatile memory 124; a power supply control section 141 configured to control the power to be supplied to each section when power supply discontinue mode is selected; and a control section 142 connected to the detecting section driving section 121, scan/readout section 122, volatile memory 123, nonvolatile memory 124 and power supply control section 142, and configured to control the operation of each section.

The control section 142 is connected to a connecting terminal 133, X-ray buzzer 134, matrix indicator 136, power supply discontinue mode indicator 144, light emitting section locking mechanism 137, detecting section sensor 145 for detecting an abnormal state of the image information detecting section 112, driving section sensor 146 for detecting an abnormal state of the detecting section driving section 121, and a readout section sensor 147 for detecting an abnormal state of the scan/readout section 122. Prior to the X-ray imaging, various kinds of data, including an imaging menu, ID information, application voltage for the image recording, reading out speed and the like are inputted from the system controller to the control section 142 through the connecting terminal 133. Also, an X-ray ready signal is inputted from the system controller to the control section 142 during the time period from the time when the preparation for the X-ray irradiation is completed until the time after the X-ray is irradiated, and an X-ray irradiation signal when the X-ray is irradiated.

When an abnormal state is detected by the detecting section sensor 145, driving section sensor 146, or readout sensor 147, the control section 142 will control the power supply control section 141 to change the power mode to a power supply discontinue mode in which the power is supplied only to the volatile memory 123 with the power to the other sections discontinued.

The battery 130 is connected to the power supply control section 141. Power supply wiring 148 extends from the power supply control section 141 to the image information detecting section 112, reading light emitting section 113, detecting section driving section 121, scan/readout section 122, volatile memory 123, nonvolatile memory 124, control section 142, X-ray buzzer 134, matrix indicator 136, and power supply discontinue mode indicator. In the normal power mode, the power is supplied from the battery 130 to each section through the power supply control section 141. In FIG. 17, the interconnections of the power supply wiring 148 are not indicated for clarity. The detecting section sensor 145, driving section sensor 146, and readout section sensor 147 serve as the abnormal state detecting means, and the power supply control section 141 serves as the power supply inhibiting means of the present invention.

Hereinafter, the operation of the image information detecting cassette 6 of this embodiment will be described. Description of the image recording and reading out operation of the cassette 6 will not be provided here, since it is substantially identical to that of the cassette 1 of the first embodiment, and the control operation for the power mode setting will be described hereinafter.

If an abnormal state is not detected by the detecting section sensor 145, driving section sensor 146 or readout section sensor 147, the control section 142 will select the normal power mode as the power mode and output the normal power mode signal to the power supply control section 141, which will supply the power to each section.

If an abnormal state is detected by the detecting section sensor 145, driving section sensor 146 or readout section sensor 147, the control section 142 will select the power supply discontinue mode as the power mode. First, the control section 142 will cause the power supply discontinue mode indicator 144 to set the power supply discontinue mode, nonvolatile memory 124 to store the abnormal state history, and light emitting section locking mechanism 137 to lock the reading light emitting section 113 if it is not locked. Thereafter, it will supply the power supply discontinue mode signal to the power supply control section 141. The power supply control section 141 will supply the power only to the volatile memory 123 with the power to the other sections discontinued. The power supply discontinue mode is not changed automatically, and predetermined manual operation is needed in order to change that power mode.

As would be clear, according to the image information detecting cassette 6, if an abnormal state is detected by the image information detecting section 121, detecting section driving section 121 or scan/readout section 122, the power supply to the sections other than the volatile memory 123 is discontinued, so that undesirable high voltages are not applied to the image information detecting section, thereby the safety of the operator may be enhanced.

Further, as the power to the volatile memory 123 is maintained, even if the image information obtained by imaging is not yet stored in the nonvolatile memory 124, it may be retained in the volatile memory 123. Where the power to the volatile memory 123 is not required, the battery 130 may be electrically disconnected from the power supply wiring 148 as in the first embodiment, in which safety of the operator may further be ensured.

In the embodiment described above, the image information detecting section 112 of a direct conversion optical reading system is used as the image information detecting section, but it is not limited to this. An image information detecting section of indirect conversion system may also be used, wherein the fluorescence emitted from a fluorescent material when irradiated by the recording light is emitted on the recording photoconductive layer, and signal charges obtained through the photoelectrical conversion of the fluorescent emitted on the photoconductive layer are stored. Further, an image information detecting section configured to read out charges generated in the photoconductive layer that takes on conductivity when irradiated by the recording light by scan driving TFTs may also be used. An image information detecting section of indirect conversion system in which fluorescence emitted from a fluorescent material by irradiating recording light is emitted on the recording photoconductive layer, and signal charges obtained through the photoelectrical conversion of the fluorescent emitted on the photoconductive layer is stored may also be used.

What is claimed is:

1. An image information detecting cassette comprising:
    an image information detecting section for recording image information by storing charges generated by the irradiation of the recording light carrying said image information,
    a detecting section driving means for applying recording electric fields to said image information detecting section;
    a reading out means for reading out image signals in accordance with said image information recorded in said image information detecting section,
    a power supplying means for supplying power to said detecting section driving means and reading out means,
    a case for accommodating said image information detecting section, detecting section driving means, reading out means, and power supplying means,
    an out-of-use state determining means for determining the out-of-use state of said image information detecting cassette, and
    a power supply suppressing means for suppressing said power supply to said detecting section driving means or reading out means when said cassette is determined to be the out-of-use state by said out-of-use state determining means.

2. An image information detecting cassette according to claim 1, further comprising: a handle attached to said case, and grippable when carried, and a handle grip detecting means for detecting the gripping of said handle,
    wherein said out-of-use state determining means is an out-of-use state determining means configured to determine said out-of-use state of said cassette based on said detection of said gripping of said handle by said handle grip detecting means.

3. An image information detecting cassette according to claim 1, further comprising: a connecting terminal capable of connecting an external device, and an unconnected state detecting means for detecting the unconnected state of said connecting terminal with said external device,
    wherein said out-of-use state determining means is an out-of-use state determining means configured to determine said out-of-use state of said cassette based on said detection of said unconnected state by said unconnected state detecting means.

4. An image information detecting cassette according to claim 1, further comprising: a wireless communication means capable of communicating with an external device, and an out-of-communication state detecting means for detecting the out-of-communication state of said wireless communication means,
    wherein said out-of-use state determining means is an out-of-use state determining means configured to determine said out-of-use state of said cassette based on said detection of said out-of-communication state by said out-of-communication state detecting means.

5. An image information detecting cassette according to claim 1, further comprising: a time overrun detecting means for measuring the elapsed time from the immediately preceding irradiation time of said recording light and detecting the time overrun of the elapsed time over a predetermined time,
    wherein said out-of-use state determining means is an out-of-use state determining means configured to determine said out-of-use state of said cassette based on said detection of said time overrun by said time overrun detecting means.

6. An image information detecting cassette according to claim 1, further comprising a power supply suppressed state indicating means for indicating that said power supply to said detecting section driving means or reading out means is suppressed by said power supply suppressing means.

7. An image information detecting cassette according to claim 2, further comprising a power supply suppressed state indicating means for indicating that said power supply to said detecting section driving means or reading out means is suppressed by said power supply suppressing means.

8. An image information detecting cassette according to claim 3, further comprising a power supply suppressed state indicating means for indicating that said power supply to said detecting section driving means or reading out means is suppressed by said power supply suppressing means.

9. An image information detecting cassette according to claim 4, further comprising a power supply suppressed state indicating means for indicating that said power supply to said detecting section driving means or reading out means is suppressed by said power supply suppressing means.

10. An image information detecting cassette according to claim 5, further comprising a power supply suppressed state indicating means for indicating that said power supply to said detecting section driving means or reading out means is suppressed by said power supply suppressing means.

11. An image information detecting cassette comprising:
    an image information detecting section for recording image information by storing charges generated by the irradiation of the recording light carrying said image information,
    a detecting section driving means for applying a recording voltage to said image information detecting section,
    a reading out means for reading out image signals in accordance with said image information recorded in said image information detecting section,
    a power supply wiring means connected to a power source and configured to supply power to said detecting section driving means and reading out means,
    a case for accommodating said image information detecting section, detecting section driving means, reading out means, and power supply wiring means,
    an abnormal state detecting means for detecting an abnormal state of said image information detecting section, detecting section driving means, or reading out means, and a power supply inhibiting means for inhibiting said power supply from said power supply wiring means to said detecting section driving means when said abnormal state is detected by said abnormal state detecting means.

12. An image information detecting cassette comprising:

an image information detecting section for recording image information by storing charges generated by the irradiation of the recording light carrying said image information, a detecting section driving means for applying a recording voltage to said image information detecting section, a reading out means for reading out image signals in accordance with said image information recorded in said image information detecting section, a power supply wiring means connected to a power source and configured to supply power to said detecting section driving means and reading out means, a case for accommodating said image information detecting section, detecting section driving means, reading out means, and power supply wiring means, an acceleration sensor, an abnormal acceleration state determining means for determining an abnormal acceleration state in which the acceleration detected by said acceleration sensor is greater than or equal to a predetermined dangerous level, and a power supply inhibiting means for inhibiting said power supply from said power supply wiring means to said detecting section driving means when said abnormal acceleration state is determined by said abnormal acceleration state determining means.

13. An image information detecting cassette according to claim 12, further comprising:

an out-of-use state determining means for determining the out-of-use state of said image information detecting cassette based on the acceleration level when the acceleration level detected by said acceleration sensor is greater than a predetermined out-of-use level, which is greater than zero and smaller than said predetermined dangerous level, and smaller than said predetermined dangerous level, and a power supply suppressing means for suppressing said power supply to said detecting section driving means or reading out means when said cassette is determined to be said out-of-use state by said out-of-use state determining means.

14. An image information detecting cassette according to claim 11, wherein said power supply inhibiting means is a power supply inhibiting means configured to electrically disconnect said power source from said power supply wiring means when inhibiting said power supply.

15. An image information detecting cassette according to claim 12, wherein said power supply inhibiting means is a power supply inhibiting means configured to electrically disconnect said power source from said power supply wiring means when inhibiting said power supply.

16. An image information detecting cassette according to claim 13, wherein said power supply inhibiting means is a power supply inhibiting means configured to electrically disconnect said power source from said power supply wiring means when inhibiting said power supply.

17. An image information detecting cassette according to claim 11, further comprising an inhibited state notifying means for notifying the inhibited state of said power supply when said power supply is inhibited by said power supply inhibiting means.

18. An image information detecting cassette according to claim 12, further comprising an inhibited state notifying means for notifying the inhibited state of said power supply when said power supply is inhibited by said power supply inhibiting means.

19. An image information detecting cassette according to claim 13, further comprising an inhibited state notifying means for notifying the inhibited state of said power supply when said power supply is inhibited by said power supply inhibiting means.

20. An image information detecting cassette according to claim 14, further comprising an inhibited state notifying means for notifying the inhibited state of said power supply when said power supply is inhibited by said power supply inhibiting means.

21. An image information detecting cassette according to claim 15, further comprising an inhibited state notifying means for notifying the inhibited state of said power supply when said power supply is inhibited by said power supply inhibiting means.

22. An image information detecting cassette according to claim 16, further comprising an inhibited state notifying means for notifying the inhibited state of said power supply when said power supply is inhibited by said power supply inhibiting means.

23. An image information detecting cassette according to claim 1, wherein said out-of-use state determining means is configured to exclude determination of said out-of-use state of said cassette when an X-ray ready is inputted.

24. An image information detecting cassette according to claim 1, wherein said out-of-use state determining means is configured to exclude determination of said out-of-use state of said cassette when a release signal is inputted.

25. An image information detecting cassette according to claim 2, wherein said out-of-use state determining means is configured to exclude determination of said out-of-use state of said cassette when an X-ray ready signal is inputted.

26. An image information detecting cassette according to claim 2, wherein said out-of-use state determining means is configured to exclude determinations of said out-of-use state of said cassette when a release signal is inputted.

27. An image information detecting cassette according to claim 3, wherein said out-of-use state determining means is configured to exclude determination of said out-of-use state of said cassette when a release signal is inputted.

28. An image information detecting cassette according to claim 5, wherein said out-of-use state determining means is configured to exclude determination of said out-of-use state of said cassette when an X-ray ready signal is inputted.

29. An image information detecting cassette according to claim 5, wherein said out-of-use state determining means is configured to exclude determination of said out-of-use state of said cassette when a release signal is inputted.

30. An image information detecting cassette according to claim 13, wherein said out-of-use state determining means is configured to exclude determination of said out-of-use state of said cassette when an X-ray ready signal is inputted.

31. An image information detecting cassette according to claim 13, wherein said out-of-use state determining means is configured to exclude determination of said out-of-use state of said cassette when a release signal is inputted.

* * * * *